(12) United States Patent
Takakubo

(10) Patent No.: US 7,023,595 B2
(45) Date of Patent: Apr. 4, 2006

(54) SCANNING OPTICAL SYSTEM

(75) Inventor: Yutaka Takakubo, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 48 days.

(21) Appl. No.: 10/845,224

(22) Filed: May 14, 2004

(65) Prior Publication Data

US 2004/0227806 A1    Nov. 18, 2004

(30) Foreign Application Priority Data

May 15, 2003    (JP)    ............................. 2003-137477

(51) Int. Cl.
  *G02B 26/08*    (2006.01)
(52) U.S. Cl. ...................... 359/204; 359/207
(58) Field of Classification Search ................ 359/204, 359/207
  See application file for complete search history.

(56) References Cited

U.S. PATENT DOCUMENTS

| | | | |
|---|---|---|---|
| 6,141,118 A | 10/2000 | Yamawaki et al. | |
| 6,717,705 B1 * | 4/2004 | Takakubo | ................... 359/207 |
| 6,771,406 B1 * | 8/2004 | Iizuka et al. | ................. 359/204 |
| 2004/0047018 A1 | 3/2004 | Takakubo | |

FOREIGN PATENT DOCUMENTS

| | | |
|---|---|---|
| JP | 10-133131 | 5/1998 |
| JP | 2003-75751 | 3/2003 |
| JP | 3450653 | 7/2003 |

* cited by examiner

*Primary Examiner*—James Phan
(74) *Attorney, Agent, or Firm*—Greenblum & Bernstein, P.L.C.

(57) ABSTRACT

In a scanning optical system, a plurality of laser beams pass through an imaging optical system and converge on surfaces to be scanned, respectively. The imaging optical system includes a scanning lens and a plurality of long lenses for the respective beams. The scanning lens has an anamorphic aspherical surface, and each long lens has at least one two-dimensional polynomial aspherical surface. A following relationship is optionally satisfied:

$$\beta < 0.15 - 0.2\theta/N,$$

where, $\beta$ denotes an absolute value of the incident angle (rad.) of the outermost one of the plurality of laser beams incident on the reflection surface in the auxiliary scanning direction, $\theta$ denotes a half field angle (rad.) representing the maximum inclination angle of the laser beam with respect to the reference axis of the scanning lens group in the main scanning direction, and N denotes the number of surfaces of the long lenses employing the two-dimensional polynomial aspherical surface.

12 Claims, 22 Drawing Sheets

SCANNING OPTICAL SYSTEM

BACKGROUND OF THE INVENTION

The present invention relates to a scanning optical system applicable to an imaging device such as a color printer and a color copier.

A scanning optical system is generally configured such that a laser beam ON/OFF modulated in accordance with image data is dynamically deflected by a polygonal mirror to scan within a certain angular range, and then converged on a surface to be scanned, which is typically evenly charged, by use of an imaging optical system so that a beam spot moves in a predetermined direction (i.e., a main scanning direction) at a constant speed. As the beam spot moves in the main scanning direction, the surface typically moves in a direction (i.e., an auxiliary scanning direction) perpendicular to the main scanning direction. With this configuration, an electrostatic two-dimensional latent image is formed on the surface to be scanned.

A one-polygon tandem scanning optical system is conventionally known as one type of scanning optical systems for color laser beam printer and the like. The one-polygon tandem scanning optical system is configured such that a plurality of beams corresponding to a plurality of color components are emitted from a plurality of beam emitting points, respectively, and that the plurality of beams are deflected by use of a single polygonal mirror. That is, a plurality of beams are simultaneously incident on the single polygonal mirror, and are directed to a plurality of imaging optical systems corresponding to the color components, respectively. The plurality of beams are then directed onto the surfaces to be scanned, thereby electrostatic latent images corresponding to respective color components are formed on the surfaces.

An exemplary configuration of a scanning optical system, in which a plurality of laser beams are simultaneously deflected by a single mirror, is disclosed in Japanese Patent Provisional Publication No. HEI 10-133131. In this publication, in order to introduce a plurality of laser beams to a plurality of imaging optical systems which are arranged in the auxiliary scanning direction spaced with each other, respectively, a plurality of laser beams are made incident on the polygonal mirror such that the laser beams are parallel with each other and aligned in the auxiliary scanning direction as spaced with each other.

In such a configuration, however, due to a mechanical limitation, a distance between the laser beams cannot be made smaller than a predetermined amount. Therefore, in the conventional one-polygon tandem scanning optical system, a dimension of the polygonal mirror in the auxiliary scanning direction (i.e., a thickness of the polygonal mirror) should be made relatively large. When the polygonal mirror is made larger, a motor to revolve the polygonal mirror is required to have a strong power, which increases a manufacturing cost of the conventional one-polygon tandem scanning optical system.

In order to avoid the above problem, an improved scanning optical system has been suggested. In the improved conventional scanning optical system, a plurality of laser beams corresponding to a plurality of color components are incident on the polygonal mirror as inclined so that the laser beams are incident on substantially the same position.

FIG. 22 schematically shows a configuration of the above-described conventional scanning device.

FIG. 22 shows a side view of the scanning optical system. As shown in FIG. 22, four laser beams are incident on a polygonal mirror 90 at the substantially same point and are directed to an imaging optical system 9a, the four beams being gradually separated as the beams travel from the polygonal mirror 90 to the imaging optical system 9a. The laser beams passed through the imaging optical system 9a are reflected by mirror 900, which are provided for respective beams. The four beams reflected by the mirror 900 are directed to long lenses 9y, 9m, 9c and 9k, which are extending in the main scanning direction, respectively. Then, the four beams are incident on photoconductive drums 9Y, 9M, 9C and 9K, respectively. With this configuration, since a plurality of beams are incident on the same position on the polygonal mirror, the thickness of the polygonal mirror can be made small.

When a plurality of beams are incident on the same point at different incident angles in the auxiliary scanning direction, various aberration occurs for the beams (e.g. bow or curvature of scanning line, wavefront distortion, etc.). It should be noted that degree of the aberrations depends on the incident angle of each beam in the auxiliary scanning direction. Therefore, problems as described below may occur.

In the above-described scanning optical system, in order to compensate for the aberrations due to the inclination of the beams, with respect to the reflection surface of the polygonal mirror, in the auxiliary scanning direction completely by the long lenses 9y, 9m, 9c and 9k, which are provided for respective beams, each of the long lenses 9y, 9m, 9c and 9k should be made to have an intrinsic surface configuration corresponding to the incident angle of the beam in the auxiliary scanning direction (in other words, the degree of aberrations). In the example of FIG. 22, since there are four beams, at least two types of surface configurations are required. When the lenses are formed by molding, a plurality of molds corresponding to the required surface configurations should be prepared, which increases a manufacturing cost of the entire scanning optical system. An example of the scanning optical system as described above is disclosed in Japanese Patent Provisional Publication No. P2003-75751.

However, when the surfaces of the long lenses for the beams are the same as in the above-described scanning optical system, it is impossible to sufficiently compensate for the above-described aberrations with maintaining the fundamental scanning performance required as the scanning optical system. That is, according to the conventional scanning optical system, some aberration is remain insufficiently compensated.

SUMMARY OF THE INVENTION

The present invention is advantageous in that an improved scanning optical system is provided which is configured such that a plurality of beams are incident on the polygonal mirror at different incident angles in the auxiliary scanning direction, and all the long lenses of the imaging optical system have the same surface shape, and further, the scan lens of the imaging optical system has a continuous surface which does not have stepped boundaries between the adjacent areas for the beams respective color components.

According to the present invention, there is provided a scanning optical system, which includes a laser source unit that emits a plurality of laser beams, a deflector that dynamically deflects the plurality of laser beams incident on a reflection surface in the main scanning direction, the plurality of laser beams being incident on the reflection surface along different paths in the auxiliary scanning direction, and an imaging lens that converges the dynamically deflected plurality of laser beams on a plurality of surfaces, which correspond to the plurality of laser beams, respectively.

In such a scanning optical system, the imaging optical system includes a scanning lens group having at least one anamorphic aspherical surface on which the dynamically deflected plurality of laser beams are incident, a cross sectional shape, In the main scanning direction, of the anamorphic aspherical surface being defined as a function of a distance in the main scanning direction from a reference axis thereof, a cross sectional shape, in the auxiliary scanning direction, of the anamorphic aspherical surface being defined, independent of the cross sectional shape in the main scanning direction, as a function of a distance from the reference axis thereof, and a plurality of long lenses on which the plurality of laser beams passed through the scanning lens group being incident, respectively, all of the plurality of long lenses having the same optical surfaces, at least one of each of the plurality of long lenses having a two-dimensional polynomial aspherical surface, cross sectional shapes, in the main scanning direction and auxiliary scanning direction, of the two-dimensional polynomial aspherical surface being defined by a polynomial regarding a distance from the reference axis. Further, the plurality of long lenses are arranged such that the reference axes of the plurality of long lenses are inclined with respect to a reference axis of the scanning lens group at different angles depending on the incident angles, in the auxiliary scanning direction, of the laser beams that pass through the plurality of long lenses, respectively.

Optionally, the scanning optical system may be configured to satisfy the following relationship:

$$\beta < 0.15 - 0.20/N,$$

where, $\beta$ denotes an absolute value of the incident angle (unit: radian) of the outermost one of the plurality of laser beams incident on the reflection surface in the auxiliary scanning direction, $\theta$ denotes a half field angle (unit: radian) representing the maximum inclination angle of the laser beam with respect to the reference axis of the scanning lens group in the main scanning direction, and N denotes the number of surfaces of the long lenses employing the two-dimensional polynomial aspherical surface.

With this configuration, a plurality of beams are incident on the polygonal mirror at different incident angles in the auxiliary scanning direction, all the long lenses of the imaging optical system have the same surface shape, and further, the scan lens of the imaging optical system has a continuous surface which does not have stepped boundaries between the adjacent areas for the beams respective color components.

Optionally, the anamorphic aspherical surface may be configured such that a cross sectional shape in the auxiliary scanning direction has an arc shape, a curvature of the cross sectional shape of the anamorphic aspherical surface in the auxiliary scanning direction varies depending on a distance from the reference axis of the scanning lens group and asymmetrically with respect to the reference axis, a refractive power in the auxiliary scanning direction of the anamorphic aspherical surface being lower at a position farther from the reference axis in the main scanning direction, and the two-dimensional polynomial aspherical surface of each of the long lenses may be configured to be asymmetrical with respect to a plane including the reference axis of each of the long lenses and parallel with the main scanning direction, the two-dimensional polynomial aspherical surface being symmetrical with respect to an auxiliary scanning plane which is a plane including reference axis of each of the long lenses and parallel with the auxiliary scanning direction, a shape of the two-dimensional polynomial aspherical surface in a direction parallel with the auxiliary scanning plane depending on a distance from the auxiliary scanning plane.

Further optionally, both surfaces of each of the plurality of long lenses may be the two-dimensional polynomial aspherical surfaces.

Still optionally, the plurality of laser beams may be incident on the scanning lens group symmetrically with respect to a main scanning plane which is defined as a plane including the reference axis of the scanning lens group and parallel with the main scanning direction, and the plurality of long lenses may be arranged symmetrically with respect to the main scanning plane.

In a particular case, four laser beams are incident on the scanning lens group, the four laser beams proceeding along two pairs of optical paths and entering the scanning lens group, one of the two pairs of optical paths being symmetrical to the other of the two pairs of optical paths with respect to the main scanning plane. The plurality of longlenses may include a pair of outer long lenses arranged at farther positions from the main scanning plane to receive a pair of outer laser beams proceeding farther paths from the main scanning plane and a pair of inner long lenses arranged at closer positions to the main scanning plane to receive a pair of inner laser beams proceeding closer paths to the main scanning plane. An intersecting point at which the reference axes of each of the outer long lenses and adjoining one of the inner long lenses intersect is located on the scanning lens group side of the long lenses, and an inclination angle of the reference axis of the adjoining one of the inner long lenses with respect to the reference axis of the each of the outer long lenses in the auxiliary scanning direction is greater than a difference between an incident angle of one of the outer laser beams with respect to the reflection surface in the auxiliary scanning direction and an incident angle of adjoining one of the inner laser beams with respect to the reflection surface in the auxiliary scanning direction.

In a particular case, the following relationship may be satisfied:

$$0.7 < (\Delta t + |s|)/\Delta \beta < 1.0$$

where, $\Delta \beta$ denotes a difference between the incident angles (unit: degrees) of the one of the outer laser beams with respect to the adjoining one of the inner laser beams, L1 and L2, incident on the reflection surface of the deflector in the auxiliary scanning direction, $\Delta t$ denotes a difference between a tilting amount (unit: degrees) of one of the outer long lenses and the adjoining one of the inner long lenses in the auxiliary scanning direction, and s denotes a difference (unit: degrees) between a maximum angles and minimum angles of the inclination of the two-dimensional polynomial aspherical surface with respect to a line parallel with the auxiliary scanning direction.

BRIEF DESCRIPTION OF THE ACCOMPANYING DRAWINGS

DESCRIPTION OF THE EMBODIMENTS

Hereinafter, referring to the accompanying drawings, scanning optical systems respectively according to four embodiments of the invention will be described.

Figure 1:
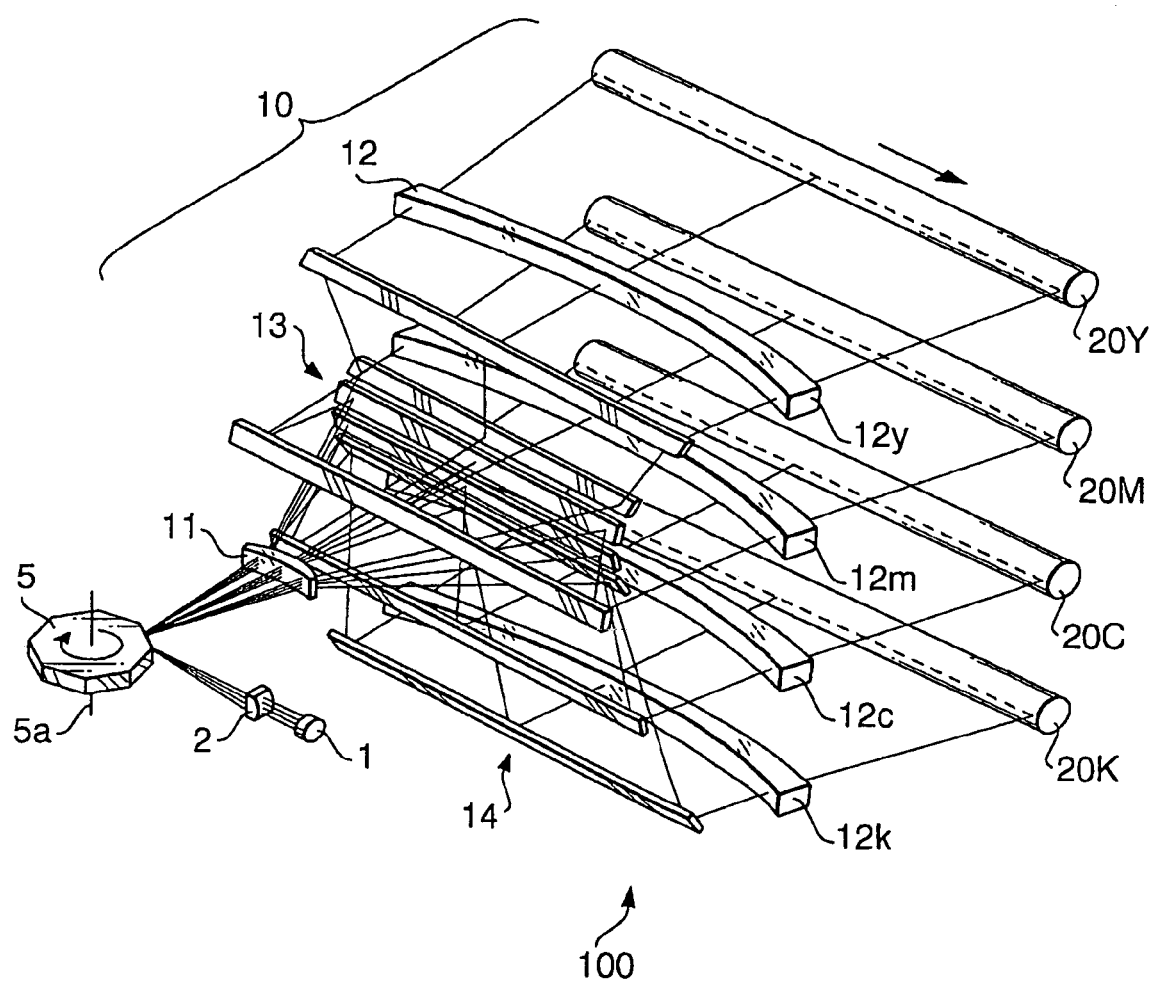
FIG. 1 is a perspective view showing a schematic structure of a scanning optical system according to the present invention.

FIG. 1 shows a perspective view of an optical configuration of a scanning optical system to which the present invention is applicable.

The scanning optical system 100 is a so-called one-polygon tandem scanning optical system. The scanning optical system 100 is typically employed in a color laser beam printer configured such that, when a recording sheet is fed once, yellow, magenta, cyan and black component images are transferred on the recording sheet sequentially, thereby a color image is formed thereon quickly.

As shown in FIG. 1, the scanning optical system 100 is configured such that four optical paths of four laser beams are deflected by a polygonal mirror 5, and the four optical paths are bent by four mirrors 13 and four mirrors 14 so that the four beams are directed to four photoconductive drums 20Y, 20M, 20C and 20K.

For the following description, a main scanning direction and an auxiliary scanning direction will be defined as follows for the convenience of explanation. That is, the main scanning direction is defined as a direction parallel with a plane that is perpendicular to a central (rotational) axis $5a$ of the polygonal mirror 5, and the auxiliary scanning direction is a direction parallel with the central axis $5a$ of the polygonal mirror 5.

Figure 2:
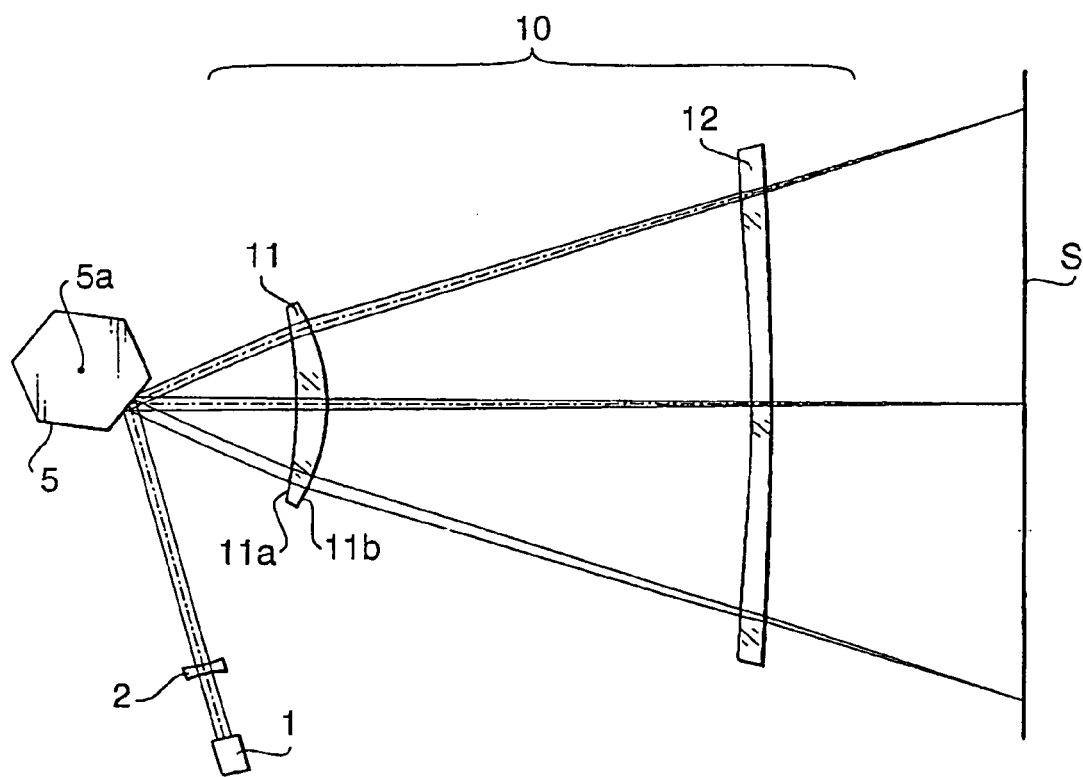
FIG. 2 shows a developed optical configuration of a main part of the scanning optical system viewed from the top.
Figure 3:
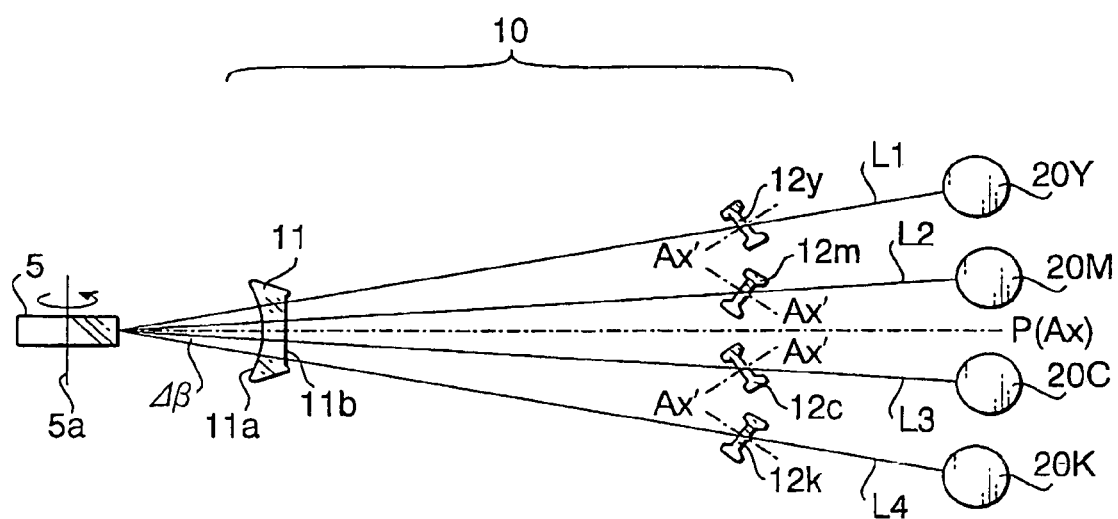
FIG. 3 shows an optical configuration of the main part of the scanning optical system viewed from the side thereof.

FIG. 2 shows a developed optical configuration of a main part of the scanning optical system 100 in the main scanning direction, and FIG. 3 shows a developed optical configuration of the main part of the scanning optical system in the auxiliary scanning direction.

As shown in FIGS. 1 through 3, the scanning optical system 100 includes a light source unit 1 that emits four laser beams, a cylindrical lens 2 having a power in the auxiliary scanning direction, the polygonal mirror 5 that is a revolving polygonal mirror member for dynamically deflecting the four laser beams emitted by the light source unit 1 in the main scanning direction, an imaging optical system 10 that converges the four laser beams deflected by the polygonal mirror 5, and the four photoconductive drums 20Y, 20M, 20C and 20K, circumferential surfaces of which serve as surfaces S to be scanned.

The four photoconductive drums 20Y, 20M, 20C and 20K are for forming (transferring) yellow, magenta, cyan and black images, respectively. The four photoconductive drums 20Y, 20M, 20C and 20K are arranged in parallel in this order with a predetermined space therebetween. The photoconductive drums 20Y, 20M, 20C and 20K are arranged along a feeding direction of a recording sheet (from the upper side to the lower side in a plane of FIG. 2).

The light source unit 1 includes four laser diodes or a chip formed with integrated four laser diodes and four collimating lens for collimating the four laser beams emitted by the four laser diodes. From the light source unit 1, four laser beams, each of which has parallel light fluxes, are emitted, the four laser beams being parallel with each other and evenly arranged in a line extending in the auxiliary scanning direction.

The cylindrical lens 2 is configured such that a cylindrical surface is located on a light incident side, and a planar surface is located on a light emerging side. The four laser beams incident on the cylindrical lens 2 are converged in the auxiliary scanning direction on a predetermined position.

The polygonal mirror 5 is formed to be a flat polygonal column, and each side surface is formed as a flat planar reflection surface. As mentioned above, the polygonal mirror 5 is rotatable about its central axis $5a$ at a constant angular speed. The polygonal mirror 5 is arranged such that one of the reflection surfaces (side surfaces thereof) is always located at a position in the vicinity of a position where the laser beams are converged by the cylindrical lens 2. The central axis 5a of the polygonal mirror 5 is parallel with the sheet feed direction of the recording sheet.

With the above configuration, the four laser beams passed through the cylindrical lens 2 are incident on and reflected by a side surface of the polygonal mirror 5 toward the imaging optical system 10 simultaneously. As the polygonal mirror 5 is rotated, the four laser beams incident on the polygonal mirror 5 are dynamically deflected by the polygonal mirror 5.

In the following description, a plane including the position where the four beams converge and perpendicular to the central axis 5a of the polygonal mirror 5 will be referred to as a main scanning section (or plane). The main scanning section is located between a pair of photoconductive drums 20M and 20C, as indicated by a dotted line in FIG. 3.

Among the four laser beams incident on the polygonal mirror 5, the inner two beams proceed along the optical paths which are symmetrical with respect to the main scanning plane. Accordingly, the incident angles of the inner two beams with respect to the main scanning plane have the same value. The outer two beams also proceed along the optical paths which are symmetrical with respect to the main scanning plane. Accordingly, the incident angles of the outer two beams with respect to the main scanning plane have the same value.

The imaging optical system 10 are configures as a lens group having a scanning speed compensating function, and having a scanning lens 11 close to the polygonal mirror 5, and long lenses 12y, 12m, 12c and 12k on a side of the photoconductive drums 20Y, 20M, 20C and 20K.

Each of the surfaces of the lenses 11, 12y, 12m, 12c and 12k are formed not to be rotationally symmetrical. Thus, each of the surfaces of the lenses 11, 12y, 12m, 12c and 12k does not have an axis of symmetry. In the following description, an axis which passes an origin of the refraction surface when expressed with a mathematical expression will be referred to as a reference axis of the optical surface, and the reference axis will be treated as an equivalence of an optical axis of a symmetric optical surface.

The scanning lens 11 has a power for converging the laser beams dynamically deflected by the polygonal mirror 5 mainly in the main scanning direction. The scanning lens 11 is arranged such that the reference axis Ax thereof is included in the main scanning plane (section). The front surface 11a (i.e., the surface facing the polygonal mirror 5) of the scanning lens 11 is formed as a rotational symmetrical continuous surface. While, the rear surface 11b (i.e., the drum side surface) of the scanning lens 11 is formed as an anamorphic asymmetrical surface whose shape in the main scanning direction is defined as a function of a distance in the main scanning direction with respect to the reference axis Ax, and whose curvature in the auxiliary scanning direction is defined as a function of a distance in the main scanning direction with respect the reference axis Ax. The reference axis Ax of the scanning lens 11 substantially coincides, in the main scanning direction, with an axis of a beam that is emitted by the laser source 1 and reflected at the center of the reflection surface of the polygonal mirror 5. Further, the cross-sectional shape of the anamorphic aspherical surface in the auxiliary scanning surface is an arc, curvature of which in the auxiliary scanning direction depends on a distance from the reference axis Ax in the main scanning direction and varies asymmetrically with respect to the reference axis Ax. Specifically, the anamorphic aspherical surface is configured such that the power in the auxiliary scanning direction is greater at a position farther from the reference axis Ax in the main scanning direction. Further, the shape of the anamorphic aspherical surface in the main scanning direction is symmetrical with respect to the reference axis Ax.

The long lenses 12 (12y, 12m, 12c and 12k) are the lenses for converging the laser beams dynamically deflected by the polygonal mirror 5 mainly in the auxiliary scanning direction, and further for compensating for curvature of field in the auxiliary scanning direction.

The reference axis Ax' of each of the long lenses 12y, 12m, 12c and 12k coincides with the reference axis Ax of the scanning lens in the main scanning direction (each of the reference axis Ax' and the reference axis Ax are parallel with each other). In the auxiliary scanning direction, the reference axis Ax' of each of the long lenses 12y, 12m, 12c and 12k is tilted in the auxiliary scanning direction with respect to the reference axis Ax (that is, the reference axis Ax' of each of the long lenses 12y, 12m, 12c and 12k is not parallel with the reference axis Ax in the auxiliary scanning direction), thereby each of the long lenses 12y, 12m, 12c and 12k is decentered (see FIG. 3).

A condition where a lens 12 (12y, 12m, 12c and 12k) is inclined such that a surface farther from the main scanning plane is inclined to confront the polygon mirror 5 will be referred to as a plus tilt condition, and a condition where a lens 12 is inclined such that the surface farther from the main scanning plane is inclined toward the surface S to be scanned will be referred to a minus tilt condition.

The reference axes of the outer long lenses (12y and 12k) are tilted more in the plus direction than the reference axes of the inner longlenses (12m and 12c). In the example shown in FIG. 5, the outer long lenses (12y and 12k) are arranged in the plus tilt condition, and the inner long lenses (12m and 12c) are arranged in the minus tilt condition. It should be noted that the inner long lenses (12m and 12c) may be tilted in the plus direction with satisfying the above condition (i.e., the outer long lenses are tilted more in the plus direction with respect to the inner long lenses).

Thus, intersecting points of the reference axes of the outer long lenses and the reference axes of the inner long lenses is always located on the scanning lens side, and the inclination angle of the reference axis in the auxiliary scanning direction of the long lens is greater than the difference of the angles of the outer laser beams and the inner laser beams in the auxiliary scanning direction.

It should be noted that the long lenses 12y, 12m, 12c and 12k have the same surface shapes. The long lenses 12y and 12m for the two laser beams L1 and L2 proceeding on the upper side of the main scanning plane P in FIG. 3 and the long lenses 12c and 12k for the two laser beams L3 and L4 proceeding on the lower side of the main scanning plane P in FIG. 3 are symmetrical with respect to the main scanning plane. At lease one surface of each of the long lenses 12 is defined by a two-dimensional polynomial aspherical surface, whose shape is an aspherical surface expressed by a polynomial regarding heights in the main and auxiliary scanning directions. The two-dimensional polynomial surface is symmetrical with respect to the reference axis Ax' in the main scanning direction, and asymmetrical with respect to the reference axis Ax' in the auxiliary scanning direction. An inclination of the surface in the auxiliary scanning direction varies depending on a distance from the reference axis Ax' in the main scanning direction.

Figure 4A:
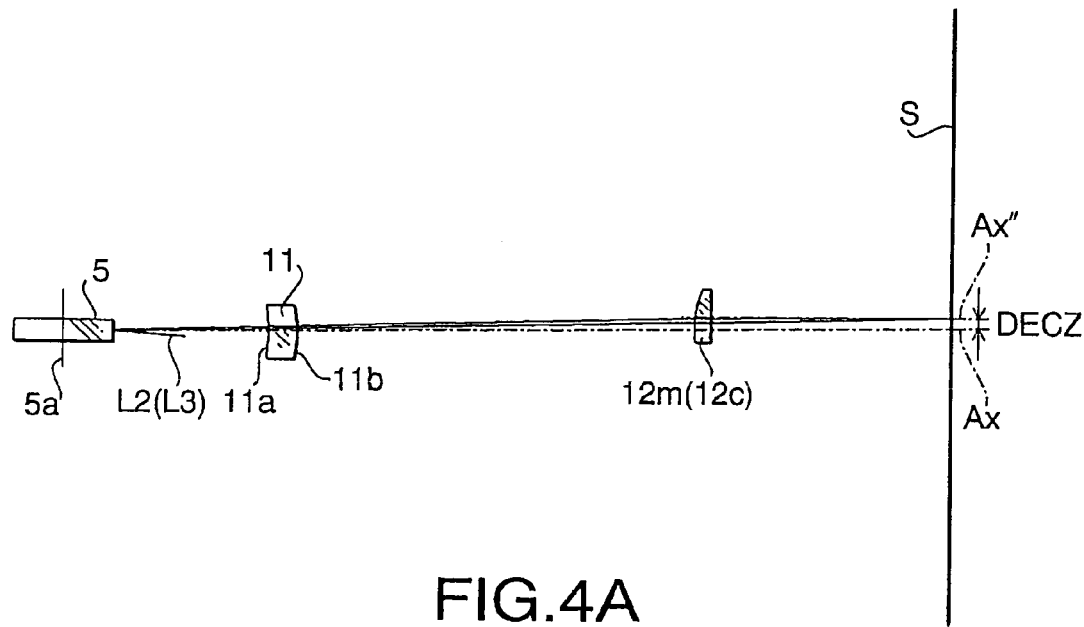
FIGS. 4A and 4B are side views of optical configurations of inner part and outer part of the scanning optical system.
Figure 4B:
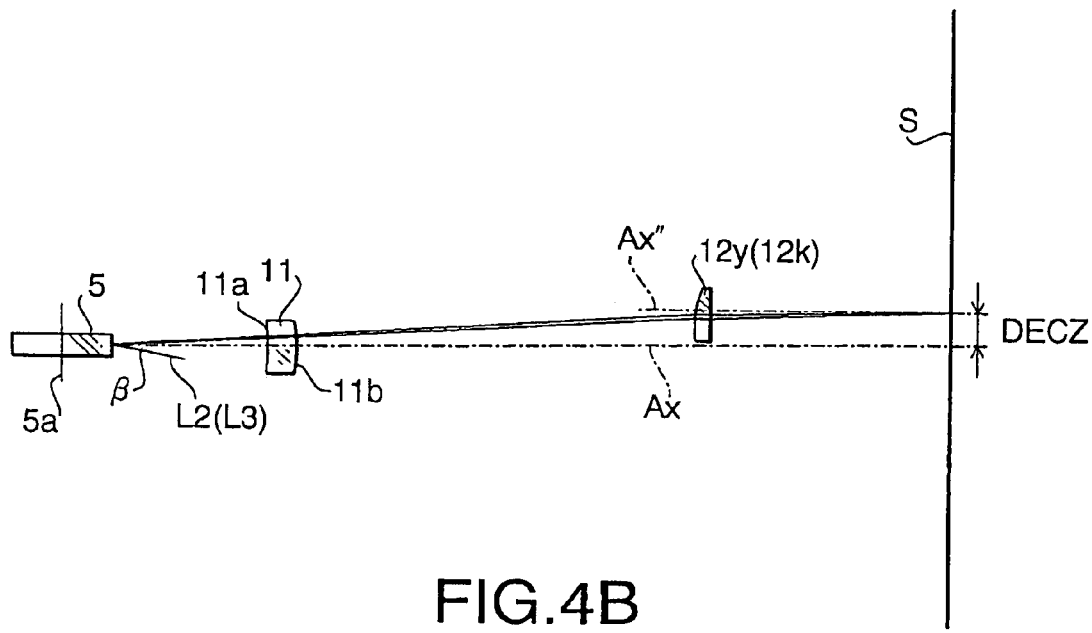

FIGS. 4A and 4B are side views of optical configurations of inner part (corresponding to the inner beams) and outer part (corresponding to the outer beams) of the scanning optical system 100. Specifically, FIG. 4A shows a main part of the optical system including the long lenses 12m and 12c for the inner beams (i.e., the laser beams proceeding on the paths closer to the main scanning plane P). FIG. 4B shows a main part of the optical system including the long lenses 12y and 12k for the outer beams (i.e., the laser beams proceeding on the paths farther from the main scanning plane P).

According to the embodiments, the scanning optical system is configured to satisfy condition (1) below:

$$\beta < 0.15 - 0.20/N \quad (1),$$

where, N denotes the number of surfaces of the long lenses employing the two-dimensional polynomial aspherical surface shape (one when only one of front surface and rear surface is formed as the two-dimensional polynomial surface; two when both of front surface and rear surface are formed as the two-dimensional polynomial aspherical surfaces), $\beta$ denotes an absolute value of the incident angle (unit: radian) of the outermost one of the four beams incident on the reflection surface of the polygonal mirror 5 in the auxiliary scanning direction, and $\theta$ denotes a half field angle (unit: radian) representing the maximum inclination angle of the laser beam with respect to the reference axis in the main scanning direction.

It is understood from condition (1) that, a rang of the incident angle $\beta$ is greater when the number N of the two-dimensional polynomial surfaces, which allows a relatively large degree of design freedom in compensating for aberrations, is greater, and when the half field angle $\theta$, which corresponds to the scanning range, is smaller.

Further, according to the embodiments, the scanning optical system is configured to satisfy condition (2) below:

$$0.7 < (\Delta t + |s|)/\Delta\beta < 1.0 \quad (2),$$

where, $\Delta\beta$ denotes a difference of the incident angles of the laser beams L1 and L2, incident on the polygonal mirror 5, both proceeding on the upper side with respect to the main scanning plane P (see FIG. 3), $\Delta t$ denotes a difference between a tilting amount of the long lens 12y on which the outer beam L1 is incident, and a tilting amount of the long lens 12m on which the inner beam L2 is incident (i.e., the inclination angle, in the auxiliary scanning direction, of the reference axis of the outer long lens with respect to the inclination angle of the inner long lens), and s denotes a maximum value of the variation of the inclination in the auxiliary scanning direction (i.e., a difference between the maximum value and the minimum value, in the auxiliary scanning direction, of the two-dimensional polynomial surface of the long lens with respect to a line parallel with the auxiliary scanning direction) within an effective area (i.e., an area, in the auxiliary scanning direction, in which the light beam passes) of the two-dimensional polynomial aspherical surface of the long lens 12. It should be noted that when both side surfaces are formed as the two-dimensional polynomial aspherical surfaces, the value s is defined as the average of the maximum variation value s1 of the front surface and the maximum variation value s2 of the rear surface.

When the scanning optical system satisfies the conditions (1) and (2), that is, when $\beta$ and $\Delta\beta$ are set to satisfy the conditions (1) and (2), even when the scanning lens 11 is formed to have continuous shape surfaces, fundamental characteristics required as the scanning lens are satisfied, and further, respective aberrations can be well compensated for.

If the conditions (1) and (2) are not satisfied, when the scanning lens 11 is formed to have continuous shape surfaces, the light fluxes may not enter the long lenses well, or the aberrations may exceed the allowable ranges.

The four laser beams emitted from the light source unit 1 as parallel light pass through the cylindrical lens 2 and are incident on the polygonal mirror 5. Then, the four beams are dynamically deflected by the polygonal mirror 5, incident on the scanning lens 11, and then incident on the imaging lens 10 including the long lenses 12y, 12m, 12c and 12k.

The four laser beams passed through the long lenses 12y, 12m, 12c and 12k are converged on the photoconductive drums 20Y, 20M, 20C and 20K, respectively, as beam spots that move in the main scanning direction at a constant speed.

The four laser beams repeatedly scan on the photoconductive drums 20Y, 20M, 20C and 20K are ON/OFF modulated in accordance with image data. As the photoconductive drums 20Y, 20M, 20C and 20K rotate at a constant speed, two-dimensional latent images are formed thereon. The imaging optical system 10 is configured such that the surfaces S to be scanned, and the side surface of the polygonal mirror 5 have a conjugate relationship in the auxiliary scanning direction. Therefore, scanning position error in the auxiliary scanning direction due to the inclination of the side surfaces of the polygonal mirror 5 (known as a facet error) can be cancelled. That is, the laser beams scan on the same lines on the surfaces S to be scanned regardless of the reflection surfaces of the polygonal mirror 5.

Figure 5:
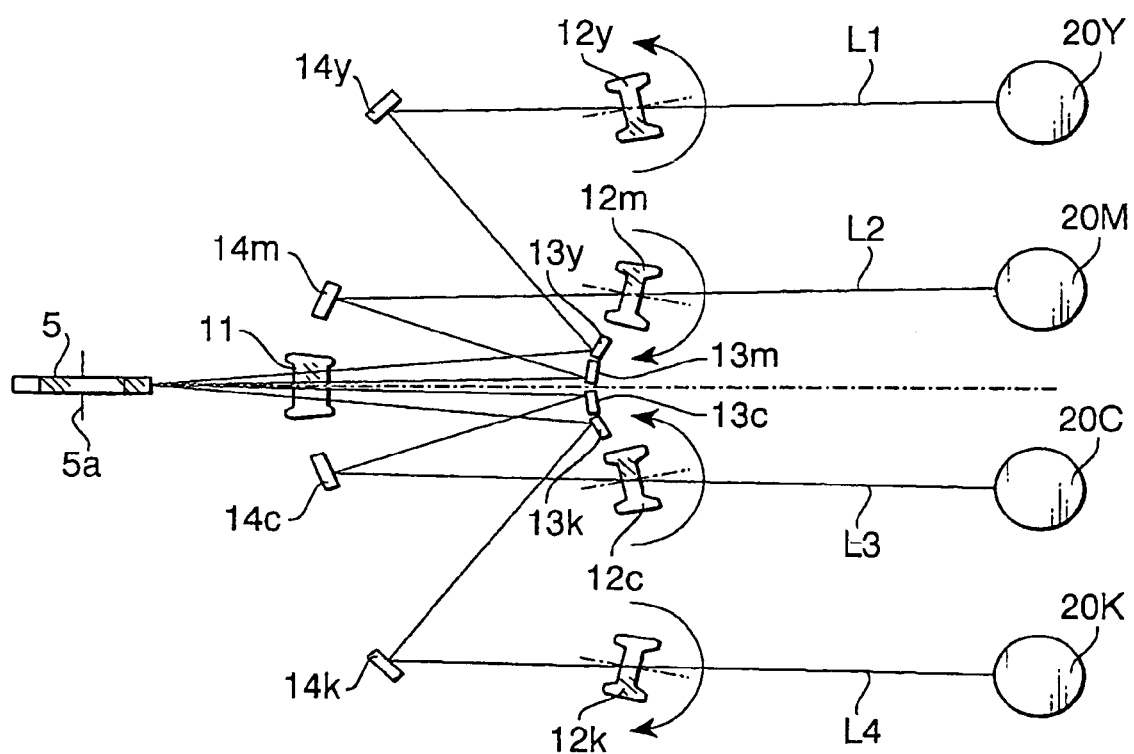
FIG. 5 is a side view showing the optical configuration of the main part of the scanning optical system according to the invention.

As shown in FIG. 5, the scanning optical system 100 is provided with the four pairs of mirrors 13 and 14 which bend the optical paths. That is, as shown in FIGS. 1 and 5, the laser beams L1, L2, L3 and L4 passed through the scanning lens 11 are reflected by four pairs of the mirrors (13y and 14y), (13m and 14m), (13c and 14c) and (13k and 14k), are incident on the long lenses 12y, 12m, 12c and 12k, and incident on the photoconductive drums 20Y, 20M, 20C and 20K, respectively.

Hereinafter, four concrete examples (first through fourth embodiments) of the invention will be described. In the following description, for the sake of simplicity, the optical paths are developed and description of the mirrors 13y, 13m, 13c, 13k, 14y, 14m, 14c and 14k is omitted.

First Embodiment

Table 1 indicates numerical structures of the inner and outer optical systems of the scanning optical system according to the first embodiment.

TABLE 1

| No. | Ry | Rz | d | n | DECZ | TILT-$\beta$ | Description |
|---|---|---|---|---|---|---|---|
| 1 | ∞ | −51.08 | 4.00 | 1.5107 | 0.00 | 0.00 | Cylindrical lens |
| 2 | ∞ | ∞ | 97.00 | 1.0000 | 0.00 | 0.00 | |
| 3 | ∞ | ∞ | 54.00 | 1.0000 | 0.00 | 0.00 | Polygonal mirror |

TABLE 1-continued

| No. | Ry | Rz | d | n | DECZ | TILT-β | Description |
|---|---|---|---|---|---|---|---|
| 4 | −208.15 | −208.15 | 10.00 | 1.4862 | 0.00 | 0.00 | Scanning lens |
| 5 | −72.16 | −100.00 | 140.00 | 1.0000 | 0.00 | 0.00 | |
| 6 | −529.85 | −529.85 | 6.00 | 1.4862 | 12.00/5.75 | 0.90/−0.95 | Long lens |
| 7 | −1800.00 | −1800.00 | 86.46 | 1.0000 | 0.00 | 0.00 | |
| 8 | ∞ | ∞ | 0.00 | 1.0000 | 1.44/−1.25 | 0.00 | Image plane |

In TABLE 1. "No." denotes a surface number starting the incident surface of the cylindrical lens 2 as one, and assigned to respective surfaces along a direction where the beam proceeds in the ascending order. Specifically, Nos. 1 and 2 represent the cylindrical lens 2, No. 3 represents the reflection surface of the polygonal mirror 5, Nos. 4 and 5 represents the front and rear surfaces of the scanning lens 11, Nos. 6 and 7 represent the front and rear surfaces of the long lens 12, and No. 8 represents the surface S to be scanned.

A symbol Ry denotes a radius of curvature (unit: mm), in the main scanning direction, of the surface on the reference axis, and Rz denotes a radius of curvature (unit: mm), in the auxiliary scanning direction, of the surface on the reference axis. A symbol d denotes a distance (unit: mm) to the next optical surface, a symbol n denotes a refractive index at the design wavelength of 780 nm.

A symbol DECZ denotes, for the long lenses 12y, 12m, 12c and 12k, a shift amount (unit: mm) in the auxiliary scanning direction on the surface S to be scanned of a reference axis Ax" when the long lenses 12y, 12m, 12c and 12k are not tilted with respect to the reference axis Ax when the long lenses 12y, 12m, 12c and 12k are tilted. This amount is indicated in FIGS. 4A and 4B.

Further, the symbol DECZ denotes, for the surface S to be scanned, a shift amount (unit: mm) of the point where the laser beam is incident on the surface S to be scanned with respect to the reference axis Ax" defined above. Since the amount is too small, it is not indicated in the drawings. It should be noted that the two values delimited with a slash "/" for the sixth and eighth surfaces represent the DECZ for the outer optical system (left-hand side value) and the inner optical system (right-hand side value).

A symbol TILT-β represents a tilt amount of each optical system. When the sign of the TILT-β is positive (+), the long lens 12 is in the plus-tilt condition, while when the sign of the TILT-β is negative (−), the long lens 12 is in the minus-tilt condition, as described above. The two values delimited with a slash "/" represent the values for the outer optical system (left-hand side value) and the inner optical system (right-hand side value).

The focal length of the entire scanning optical system is 235 mm, and the effective scanning width on the surface S to be scanned is 216 mm.

For the convenience of explanation, an auxiliary scanning section (plane) is defined as a plane including the reference axis Ax and perpendicular to the main scanning plane (i.e., a plane including the reference axis Ax and perpendicular to the central axis 5a of the polygonal mirror 5).

According to the first embodiment when the optical paths of the laser beams incident on the polygonal mirror 5 are projected onto the auxiliary scanning plane, the incident angle of the outer beam with respect to the polygonal mirror 5 on the auxiliary scanning plane is 3.6° and that of the inner beam is 1.2°. When the optical paths of the laser beams incident on the polygonal mirror 5 are projected on the main scanning plane, the beams are inclined with respect to the reference axis by 75.0° on the main scanning plane.

By applying the above values to condition (1) since $\beta=0.0628$ (rad.), $\theta=0.4311$ (rad.) and $N=1$, $\beta$ is calculated to be less than 0.0638. That is, according to the first embodiment, condition (1) is satisfied.

By applying the above values to condition (2), since $\Delta t=1.85°$, $|s|=0.47°$ and $\Delta\beta=2.4°$, $(\Delta t+|s|)/\Delta\beta=0.96$. That is, it is understood that the first embodiment satisfies condition (2).

According to the first embodiment, the front surface 11a of the scanning lens 11 (i.e., the fourth surface) is a concave spherical surface, and the next surface (i.e., the fifth surface) is formed as the anamorphic aspherical surface. Further, the front surfaces (i.e., sixth surfaces) of the long lenses 12y, 12m, 12c and 12k are formed as the two-dimensional polynomial aspherical surfaces, and the seventh surfaces thereof are formed as convex spherical surfaces.

The shape of the anamorphic aspherical surface on the main scanning section is expressed by formula (3), which represents a SAG amount X(y) representing a distance from a plane tangent to the surface to the reference axis at a point whose distance from the reference axis in the main scanning direction is y. The shape of the surface in the auxiliary scanning direction at a point whose distance from the reference axis is y is an arc represented by formula (4). In formula (4), $1/[Rz(y)]$ represents a curvature in the auxiliary scanning direction at the distance y from the reference axis.

$$X(y) = \frac{1}{Ry} \cdot \frac{y^2}{1+\sqrt{1-(\kappa+1)^2 y^2/Ry^2}} + AM_1 y + AM_2 y^2 + \quad (3)$$
$$AM_3 y^3 + AM_4 y^4 + AM_5 y^5 + AM_6 y^6 + AM_7 y^7 + AM_8 y^8 + \cdots$$

$$1/[Rz(y)] = 1/Rz + AS_1 y + AS_2 y^2 + AS_3 y^3 + AS_4 y^4 + AS_5 y^5 + AS_6 y^6 + AS_7 y^7 + AS_8 y^8 + \quad (4)$$

In formulae (3) and (4), Ry represents the radius of curvature in the main scanning direction, and Rz represents the radius of curvature in the auxiliary scanning direction indicated in TABLE 1. Further, $\kappa$ represents a conical coefficient, $AM_1$, $AM_2$, $AM_3$, $AM_4$, $AM_5$, $AM_6$, $AM_7$, $AM_8$. . . represent first, second, third, fourth, fifth, sixth, seventh, eights . . . aspherical coefficients regarding the main scanning direction, and $AS_1$, $AS_2$, $AS_3$, $AS_4$, $AS_5$, $AS_6$, $AS_7$, $AS_8$. . . represent first, second, third, fourth, fifth, sixth, seventh, eights . . . aspherical coefficients regarding the auxiliary scanning direction.

TABLE 2 indicates the values of the above coefficients to be substituted in formulae (3) and (4) to obtain the shape of the rear surface (i.e., fifth surface) of the scanning lens 11. In TABLE 2, E represents ten's power. For example, 5.733E−06 represents $5.733 \times 10^{-06}$.

TABLE 2

| κ | | | 00E+00 |
|---|---|---|---|
| $AM_1$ | 0.000E+00 | $AS_1$ | 5.733E−06 |
| $AM_2$ | 0.000E+00 | $AS_2$ | 6.259E−07 |
| $AM_3$ | 0.000E+00 | $AS_3$ | 3.805E−09 |
| $AM_4$ | 1.038E−07 | $AS_4$ | 1.650E−09 |
| $AM_5$ | 0.000E−00 | $AS_5$ | 3.402E−12 |
| $AM_6$ | 1.972E−11 | $AS_6$ | −3.104E−12 |
| $AM_7$ | 0.000E+00 | $AS_7$ | −4.493E−15 |
| $AM_8$ | −4.441E−15 | $AS_8$ | 1.441E−15 |

The two-dimensional polynomial aspherical surface is a surface defined by a SAG amount X(y, z), which represents a distance from a plane tangent to the surface. The SAG amount is defined by a polynomial having variables in the main scanning direction (y-direction) and the auxiliary scanning direction (z-direction). The intersecting point of tangential plane and the reference axis is an origin which is defined when the surface is designed. The two-dimensional polynomial surface is defined by formula (5).

$$X(y, z) = \frac{1}{Ry} \cdot \frac{y^2 + z^2}{1 + \sqrt{1 - (\kappa + 1) \cdot (y^2 + z^2)/Ry^2}} + \sum b_{mn} y^m z^n \quad (5)$$

In formula (5), Ry represents a radius of curvature in the main scanning direction indicated in TABLE 1, κ represents a conical coefficient, bmn represents an aspherical coefficient of m-th order in the main scanning direction and n-th order in the auxiliary scanning direction. TABLE 3 indicates coefficients indicating the concrete shapes of the front surfaces (sixth surfaces) of the long lenses 12y, 12m, 12c and 12k in the first embodiment.

Figure 6A:
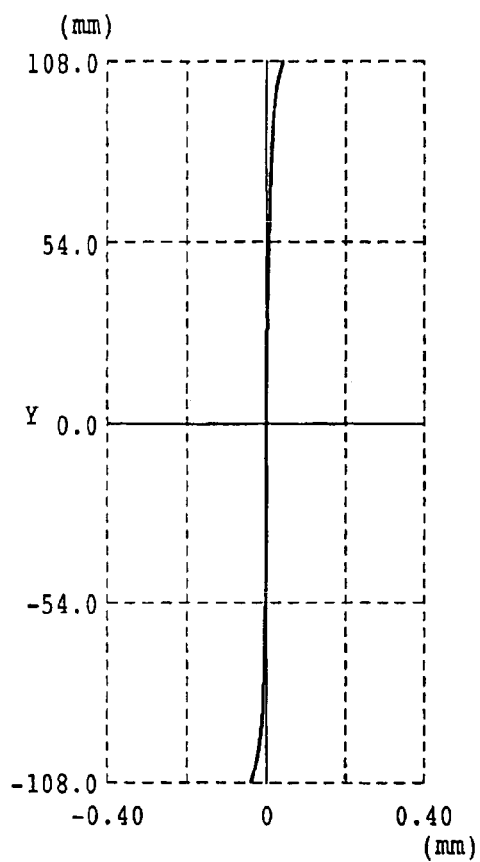
FIGS. 6A and 6B are graphs showing fθ errors of the inner optical system and outer optical system, respectively, according to a first embodiment.
Figure 6B:
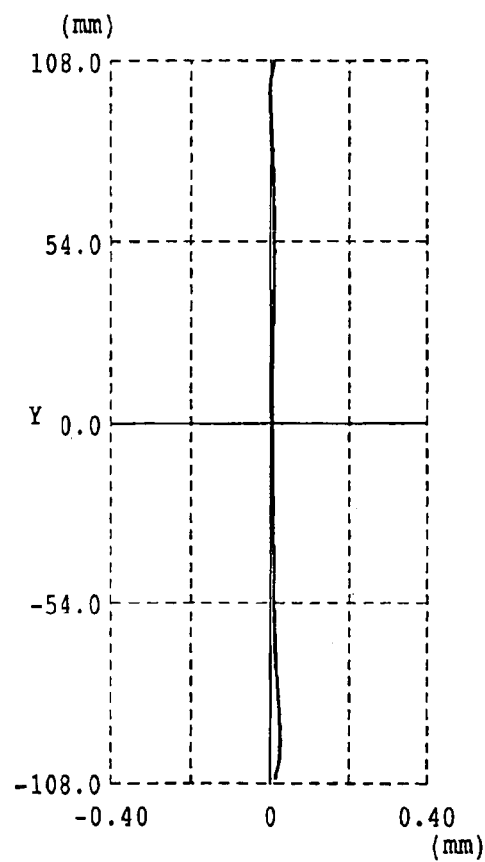
Figure 7A:
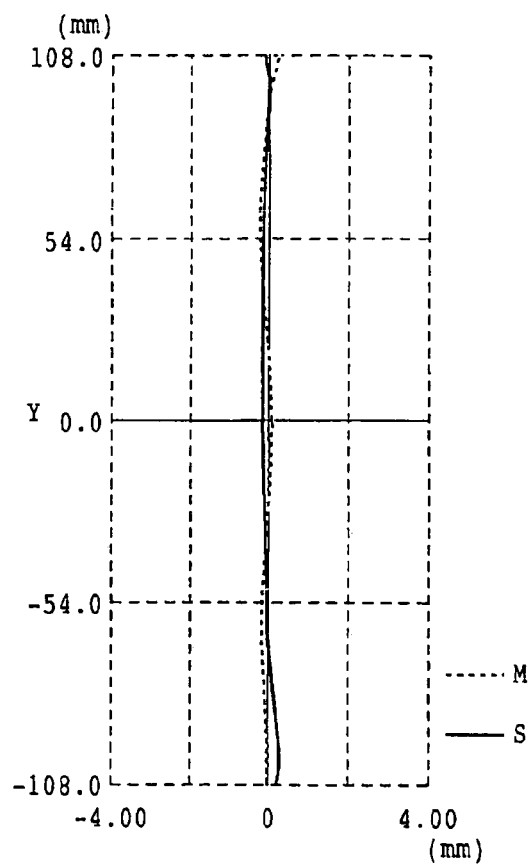
FIGS. 7A and 7B are graphs showing curvatures of field of the inner optical system and outer optical system, respectively, according to the first embodiment.
Figure 7B:
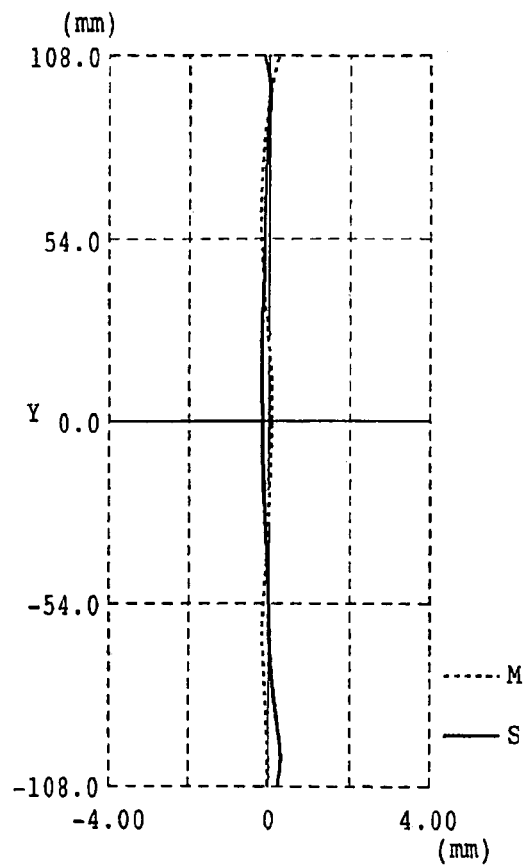
Figure 8A:
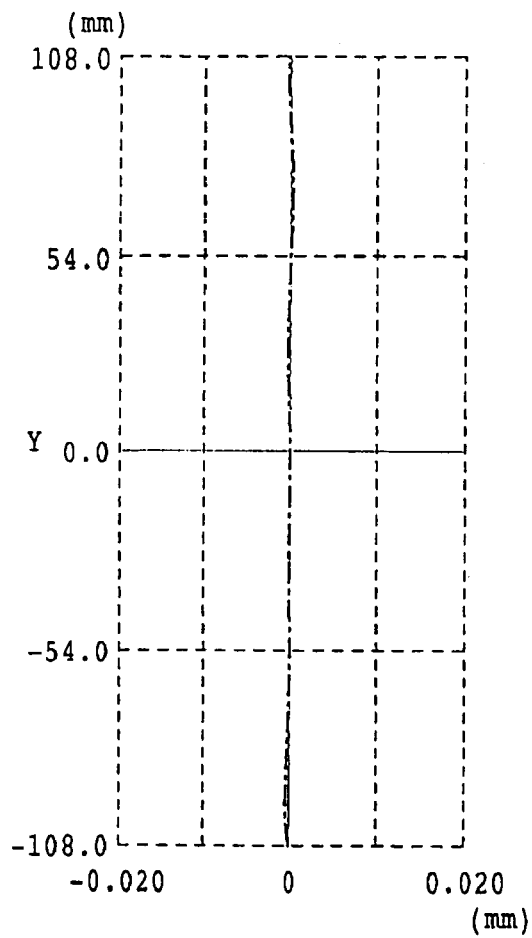
FIGS. 8A and 8B are graphs showing curvatures of scan line of the inner optical system and outer optical system, respectively, according to the first embodiment.
Figure 8B:
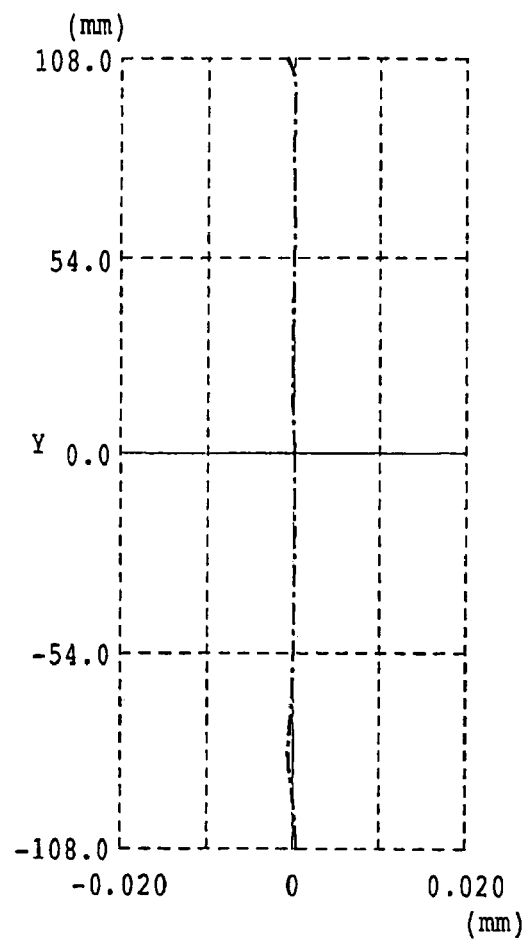
Figure 9A:
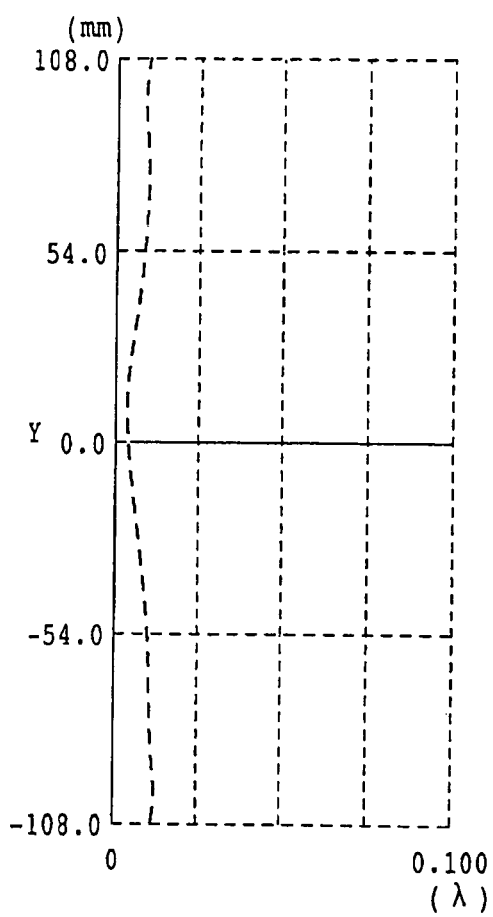
FIGS. 9A and 9B are graphs showing wavefront aberrations of the inner optical system and outer optical system, respectively, according to the first embodiment.
Figure 9B:
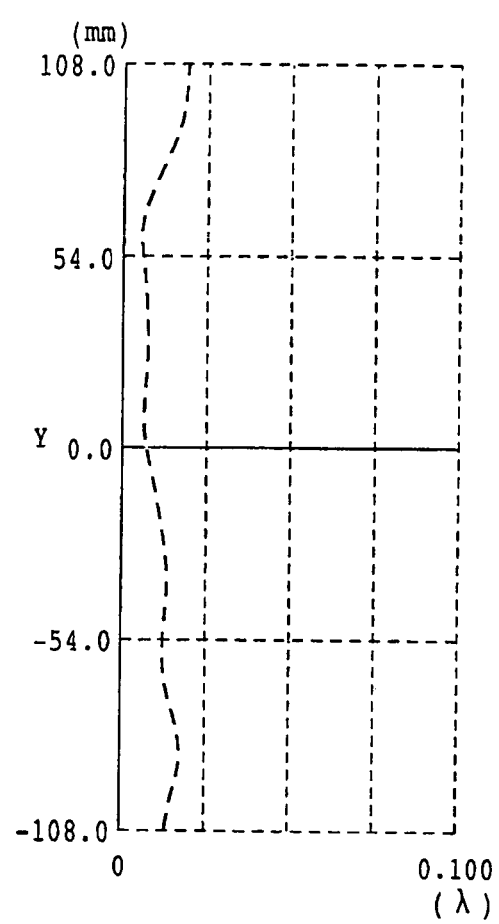

Optical performance of the optical systems in the scanning optical system according to the first embodiment is indicated in FIGS. 6A through 9B. Specifically, FIGS. 6A and 6B are graphs showing fθ errors of the inner optical system and outer optical system, respectively. FIGS. 7A and 7B are graphs showing curvatures of field, in the main scanning direction (broken line) and the auxiliary scanning direction (solid line) of the inner optical system and outer optical system, respectively. FIGS. 8A and 8B are graphs showing curvatures of scan line (bow) of the inner optical system and outer optical system, respectively. FIGS. 9A and 9B are graphs showing wavefront aberrations of the inner optical system and outer optical system, respectively.

In each of the graphs, a vertical axis Y represents a position in the main scanning direction, and a horizontal axis represents a quantity of the aberration. In each graph, the unit of measure of the vertical axis is [mm], and in each of the graphs shown in FIGS. 6A through 8B, the unit of measure of the horizontal axis is [mm]. In the graphs shown in FIGS. 9A and 9B, the unit of the horizontal axis is a wavelength (RMS value).

FIGS. 6A, 7A, 8A and 9A represent characteristics of the inner optical system, and FIGS. 6B, 7B, 8B and 9B represent characteristics of the outer optical system.

As indicated in FIGS. 6A through 9B, according to the first embodiment, the scanning optical system satisfies the fundamental requirements such as the fθ characteristic, curvature of field characteristic and the like, and further the bow is well compensated and the twist of the wavefront is sufficiently suppressed.

Second Embodiment

Table 4 indicates numerical structures of the inner and outer optical systems of the scanning optical system according to the second embodiment.

TABLE 3

| | $B_{z0}$ | $B_{z1}$ | $B_{z2}$ | $B_{z3}$ | $B_{z4}$ |
|---|---|---|---|---|---|
| $B_{y0}$ | — | 8.255E−02 | 1.666E−02 | −3.700E−05 | −2.245E−06 |
| $B_{y1}$ | 0.000E+00 | 0.000E+00 | 0.000E+00 | 0.000E+00 | 0.000E+00 |
| $B_{y2}$ | 0.000E+00 | −2.564E−07 | −2.292E−07 | 5.123E−09 | −3.813E−10 |
| $B_{y3}$ | 0.000E+00 | 0.000E+00 | 0.000E+00 | 0.000E+00 | 0.000E+00 |
| $B_{y4}$ | 7.026E−08 | −6.547E−11 | 1.448E−11 | 3.575E−13 | −5.132E−14 |
| $B_{y5}$ | 0.000E+00 | 0.000E+00 | 0.000E+00 | 0.000E+00 | 0.000E+00 |
| $B_{y6}$ | −1.594E−12 | −1.133E−15 | −4.810E−15 | −1.630E−16 | 0.000E+00 |
| $B_{y7}$ | 0.000E+00 | 0.000E+00 | 0.000E+00 | 0.000E+00 | 0.000E+00 |
| $B_{y8}$ | 7.188E−18 | 1.368E−18 | 4.063E−19 | 0.000E+00 | 0.000E+00 |

TABLE 4

| No. | Ry | Rz | d | n | DECZ | TILT-β | Description |
|---|---|---|---|---|---|---|---|
| 1 | ∞ | −51.08 | 4.00 | 1.5107 | 0.00 | 0.00 | Cylindrical lens |
| 2 | ∞ | ∞ | 97.00 | 1.0000 | 0.00 | 0.00 | |
| 3 | ∞ | ∞ | 45.00 | 1.0000 | 0.00 | 0.00 | Polygonal mirror |
| 4 | −190.61 | −190.61 | 10.00 | 1.4862 | 0.00 | 0.00 | Scanning lens |
| 5 | −62.91 | −100.00 | 113.70 | 1.0000 | 0.00 | 0.00 | |
| 6 | −482.53 | −482.53 | 6.00 | 1.4862 | 7.00/3.49 | 0.20/−0.78 | Long lens |
| 7 | −1800.00 | −1800.00 | 78.75 | 1.0000 | 0.00 | 0.00 | |
| 8 | ∞ | ∞ | 0.00 | 1.0000 | 0.68/−0.99 | 0.00 | Image plane |

Meaning of each item in TABLE 4 is similar to that in TABLE 1. The focal length of the entire scanning optical system is 200 mm, and the effective scanning width on the surface S to be scanned is 216 mm.

According to the second embodiment, when the optical paths of the laser beams incident on the polygonal mirror 5 are projected onto the auxiliary scanning plane, the incident angle of the outer beam with respect to the polygonal mirror 5 on the auxiliary scanning plane is 2.58° and that of the inner beam is 0.86°. When the optical paths of the laser beams incident on the polygonal mirror 5 are projected on the main scanning plane, the beams are inclined with respect to the reference axis by 65.0° on the main scanning plane.

By applying the above values to condition (1), since $\beta=0.0450$ (rad.), $\theta=0.4957$ (rad.) and $N=1$, $\beta$ is calculated to be less than 0.0509. That is, according to the second embodiment, condition (1) is satisfied.

By applying the above values to condition (2), since $\Delta t=0.98°$, $|s|=0.32°$ and $\Delta\beta=1.7°$, $(\Delta t+|s|)/\Delta\beta=0.76$. That is, it understood that the second embodiment satisfies condition (2).

TABLE 5 indicates the values of the above coefficients to be substituted in formulae (3) and (4) to obtain the shape of the rear surface (i.e., fifth surface) of the scanning lens 11.

TABLE 5

| κ | | | 00E+00 |
|---|---|---|---|
| $AM_1$ | 0.000E+00 | $AS_1$ | −1.931E−06 |
| $AM_2$ | 0.000E+00 | $AS_2$ | −4.768E−07 |
| $AM_3$ | 0.000E+00 | $AS_3$ | −2.531E−08 |
| $AM_4$ | 2.027E−07 | $AS_4$ | 2.223E−09 |
| $AM_5$ | 0.000E−00 | $AS_5$ | 6.081E−11 |
| $AM_6$ | −4.439E−12 | $AS_6$ | −4.299E−12 |
| $AM_7$ | 0.000E+00 | $AS_7$ | −3.450E−14 |
| $AM_8$ | 1.121E−14 | $AS_8$ | 1.957E−15 |

TABLE 6 indicates coefficients indicating the concrete shapes of the front surfaces (sixth surfaces) of the long lenses 12y, 12m, 12c and 12k In the second embodiment.

TABLE 6

| | $B_{z0}$ | $B_{z1}$ | $B_{z2}$ | $B_{z3}$ | $B_{z4}$ |
|---|---|---|---|---|---|
| $B_{y0}$ | — | 6.546E−02 | 1.892E−02 | −2.590E−05 | −2.213E−06 |
| $B_{y1}$ | 0.000E+00 | 0.000E+00 | 0.000E+00 | 0.000E+00 | 0.000E+00 |
| $B_{y2}$ | 0.000E+00 | −4.558E−07 | −3.658E−07 | −8.944E−10 | −3.521E−10 |
| $B_{y3}$ | 0.000E+00 | 0.000E+00 | 0.000E+00 | 0.000E+00 | 0.000E+00 |
| $B_{y4}$ | 1.193E−07 | −1.759E−10 | −7.123E−12 | 1.211E−12 | −5.124E−14 |
| $B_{y5}$ | 0.000E+00 | 0.000E+00 | 0.000E+00 | 0.000E+00 | 0.000E+00 |
| $B_{y6}$ | −5.467E−12 | 1.138E−14 | 7.969E−16 | −1.246E−16 | 0.000E+00 |
| $B_{y7}$ | 0.000E+00 | 0.000E+00 | 0.000E+00 | 0.000E+00 | 0.000E+00 |
| $B_{y8}$ | 1.772E−16 | −1.769E−19 | 0.000E+00 | 0.000E+00 | 0.000E+00 |

Figure 10A:
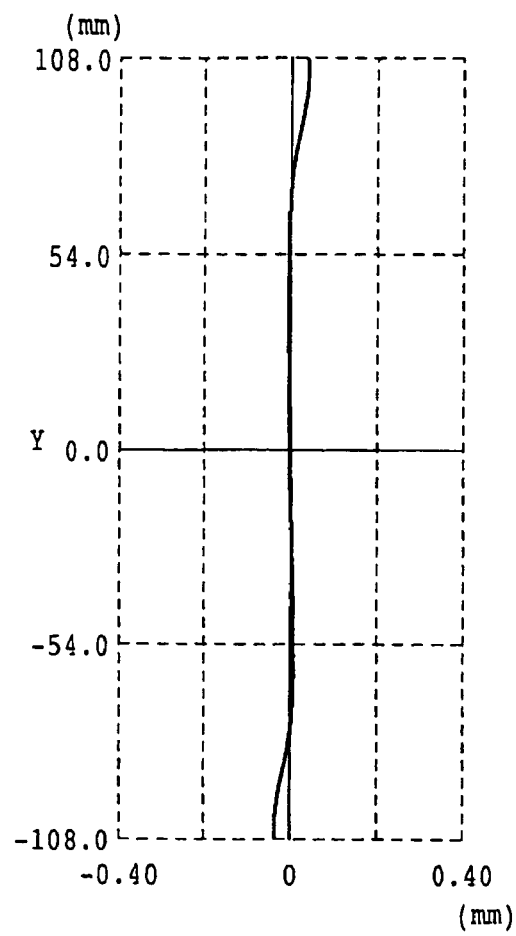
FIGS. 10A and 10B are graphs showing fθ errors of the inner optical system and outer optical system, respectively, according to a second embodiment.
Figure 10B:
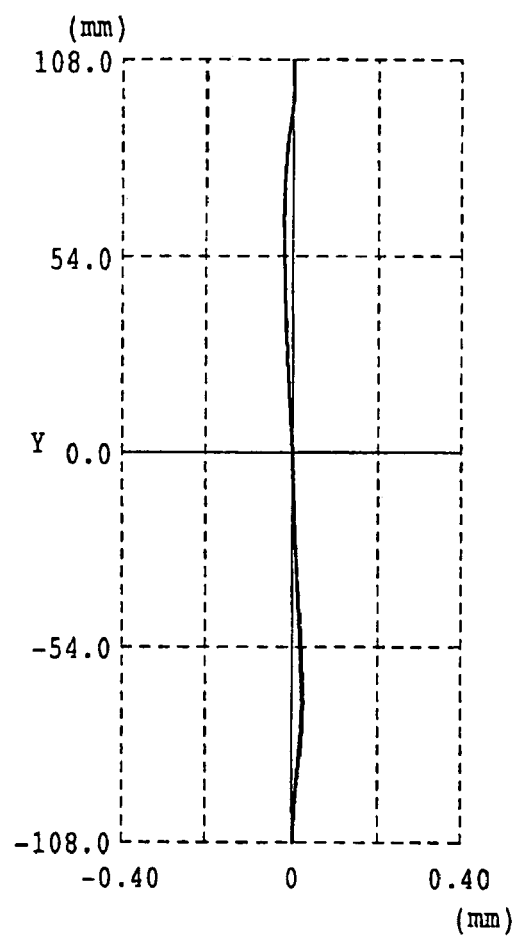
Figure 11A:
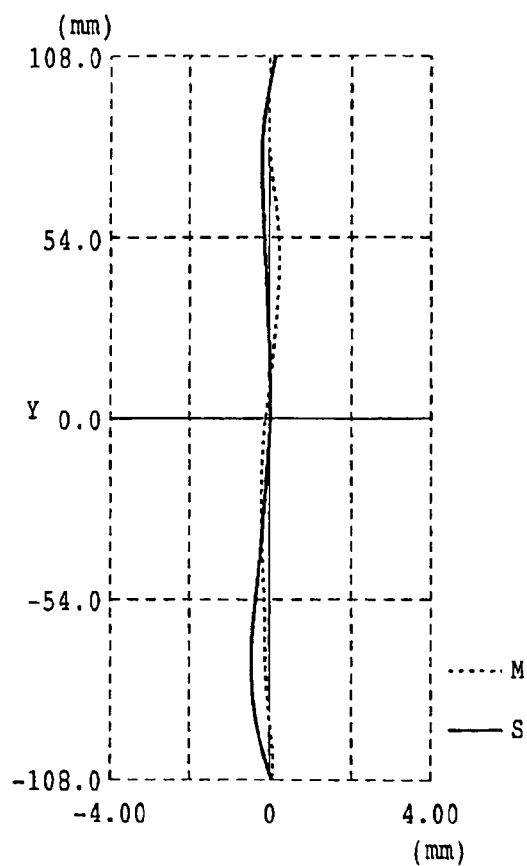
FIGS. 11A and 11B are graphs showing curvatures of field of the inner optical system and outer optical system, respectively, according to the second embodiment.
Figure 11B:
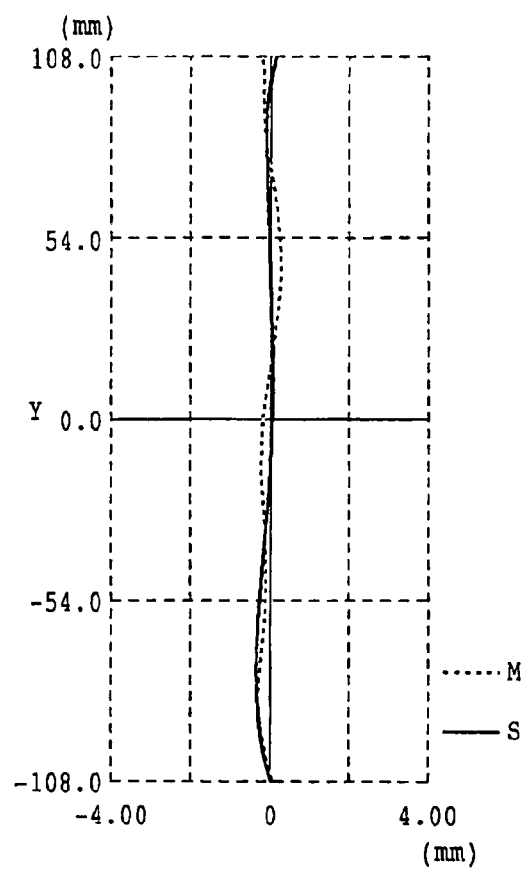
Figure 12A:
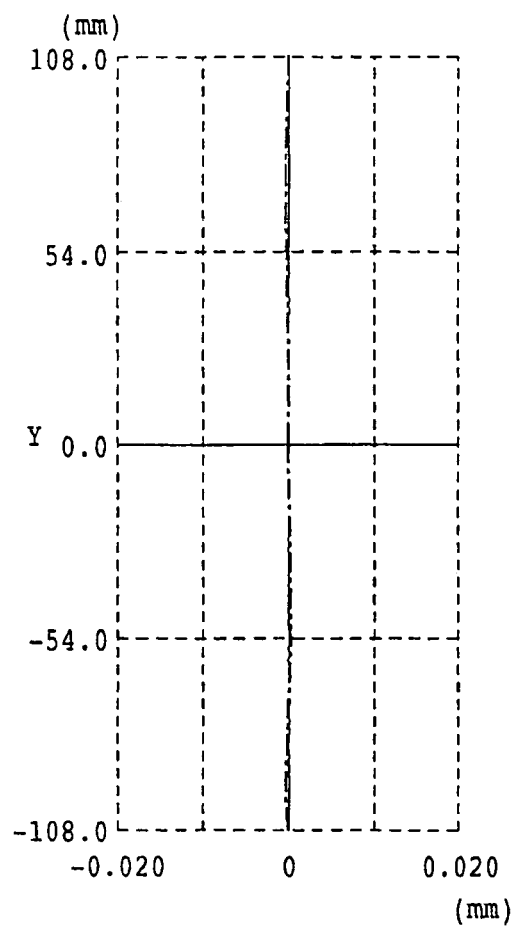
FIGS. 12A and 12B are graphs showing curvatures of scan line of the inner optical system and outer optical system, respectively, according to the second embodiment.
Figure 12B:
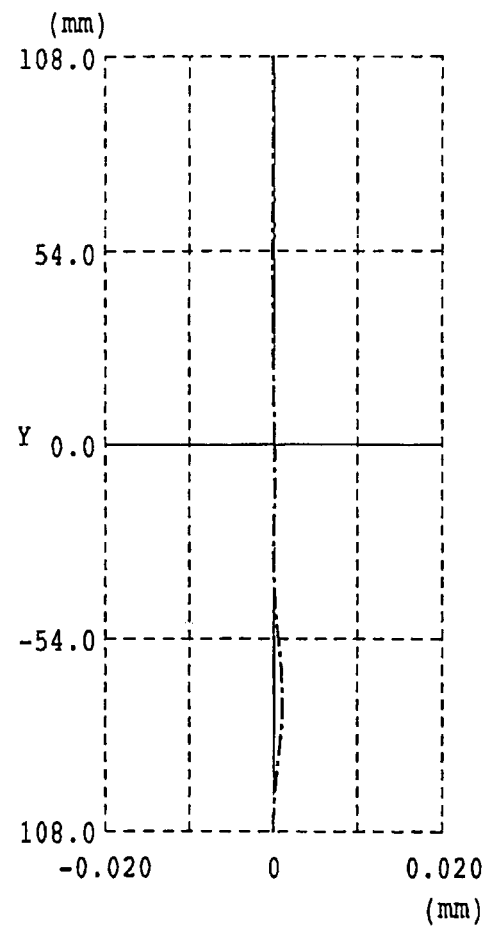
Figure 13A:
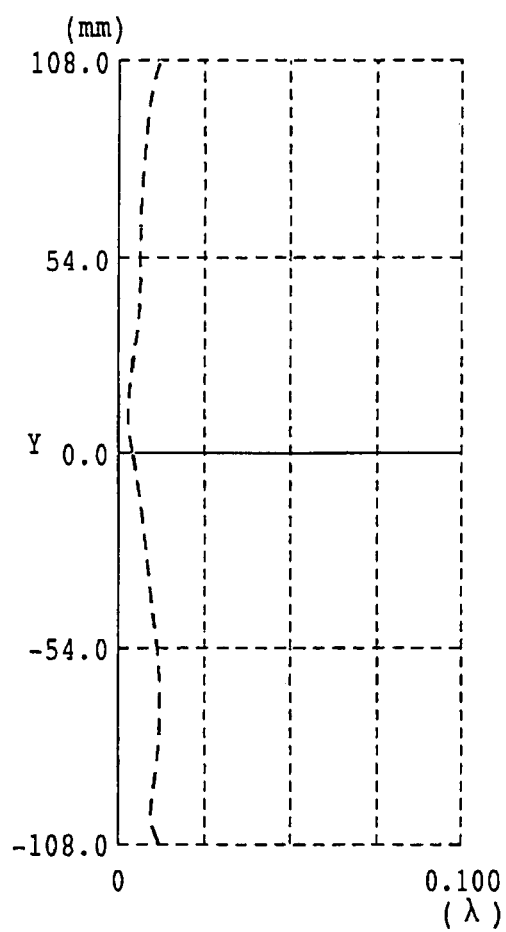
FIGS. 13A and 13B are graphs showing wavefront aberrations of the inner optical system and outer optical system, respectively, according to the second embodiment.
Figure 13B:
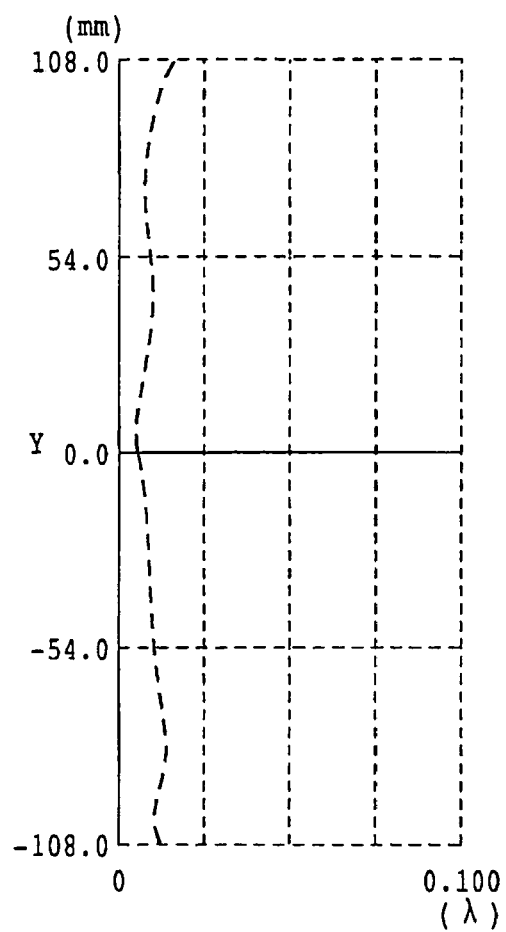

Optical performance of the optical systems in the scanning optical system according to the second embodiment is indicated in FIGS. 10A through 13B. Specifically, FIGS. 10A and 10B are graphs showing fθ errors of the inner-optical system and outer optical system, respectively. FIGS. 11A and 11B are graphs showing curvatures of field, in the main scanning direction (broken line) and the auxiliary scanning direction (solid line) of the inner optical system and outer optical system, respectively. FIGS. 12A and 12B are graphs showing curvatures of scan line (bow) of the inner optical system and outer optical system, respectively. FIGS. 13A and 13B are graphs showing wavefront aberrations of the inner optical system and outer optical system, respectively.

In each of the graphs, a vertical axis Y represents a position in the main scanning direction, and a horizontal axis represents a quantity of the aberration. In each graph, the unit of measure of the vertical axis is [mm], and in each of the graphs shown in FIGS. 10A through 12B, the unit of measure of the horizontal axis is [mm]. In the graphs shown in FIGS. 13A and 13B, the unit of the horizontal axis is a wavelength (RMS value).

As indicated in FIGS. 10A through 13B, according to the second embodiment, the fundamental requirements are satisfied, while various aberrations are well suppressed.

Third Embodiment

Table 7 indicates numerical structures of the inner and outer optical systems of the scanning optical system according to the third embodiment.

TABLE 7

| No. | Ry | Rz | d | n | DECZ | TILT-$\beta$ | Description |
|---|---|---|---|---|---|---|---|
| 1 | $\infty$ | −51.08 | 4.00 | 1.5107 | 0.00 | 0.00 | Cylindrical lens |
| 2 | $\infty$ | $\infty$ | 97.00 | 1.0000 | 0.00 | 0.00 | |
| 3 | $\infty$ | $\infty$ | 45.00 | 1.0000 | 0.00 | 0.00 | Polygonal mirror |
| 4 | −177.22 | −177.22 | 9.00 | 1.4862 | 0.00 | 0.00 | Scanning lens |
| 5 | −64.76 | −110.45 | 135.70 | 1.0000 | 0.00 | 0.00 | |
| 6 | −398.49 | −398.49 | 6.00 | 1.4862 | 9.50/3.74 | 2.50/0.65 | Long lens |
| 7 | −1800.00 | −1800.00 | 74.53 | 1.0000 | 0.00 | 0.00 | |
| 8 | $\infty$ | $\infty$ | 0.00 | 1.0000 | 2.77/0.39 | 0.00 | Image plane |

Meaning of each item in TABLE 7 is similar to that in TABLE 1. The focal length of the entire scanning optical system is 220 mm, and the effective scanning width on the surface S to be scanned is 216 mm.

According to the third embodiment, when the optical paths of the laser beams incident on the polygonal mirror 5 are projected onto the auxiliary scanning plane, the incident angle of the outer beam with respect to the polygonal mirror 5 on the auxiliary scanning plane is 3.26° and that of the inner beam is 1.09°. When the optical paths of the laser beams incident on the polygonal mirror 5 are projected on the main scanning plane, the beams are inclined with respect to the reference axis by 70.0° on the main scanning plane.

By applying the above values to condition (1), since $\beta$=0.0569 (rad.), $\theta$=0.4555 (rad.) and N=1, $\beta$ is calculated to be less than 0.0589. That is, according to the third embodiment, condition (1) is satisfied.

By applying the above values to condition (2), since $\Delta t$=1.86°, $|s|$=0.18° and $\Delta\beta$=2.2°, $(\Delta t+|s|)/\Delta\beta$=0.94. That is, it is understood that the third embodiment satisfies condition (2).

In the third embodiment, the front surface (i.e., fourth surface) of the scanning lens 11 is formed as a concave spherical surface, and the rear surface thereof (i.e., fifth surface) is formed as an anamorphic aspherical surface. Further, the front surfaces (i.e., sixth surfaces) of the long lenses 12y, 12m, 12c and 12k are formed as two-dimensional polynomial aspherical surfaces, and the rear surfaces thereof (i.e., seventh surfaces) are formed as convex spherical surfaces.

TABLE 8 indicates the values of the coefficients to be substituted in formulae (3) and (4) to obtain the shape of the rear surface (i.e., fifth surface) of the scanning lens 11 according to the third embodiment.

TABLE 8

| $\kappa$ | | 00E+00 | |
|---|---|---|---|
| $AM_1$ | 0.000E+00 | $AS_1$ | 3.967E−06 |
| $AM_2$ | 0.000E+00 | $AS_2$ | 9.708E−07 |
| $AM_3$ | 0.000E+00 | $AS_3$ | 2.520E−08 |
| $AM_4$ | 1.293E−07 | $AS_4$ | 9.072E−09 |
| $AM_5$ | 0.000E−00 | $AS_5$ | −3.851E−11 |
| $AM_6$ | 6.151E−11 | $AS_6$ | −1.659E−11 |
| $AM_7$ | 0.000E+00 | $AS_7$ | 2.290E−14 |
| $AM_8$ | −2.963E−14 | $AS_8$ | 9.218E−15 |

TABLE 9 indicates coefficients indicating the concrete shapes of the front surfaces (sixth surfaces) of the long lenses 12y, 12m, 12c and 12k in the third embodiment.

TABLE 9

| | $B_{z0}$ | $B_{z1}$ | $B_{z2}$ | $B_{z3}$ | $B_{z4}$ |
|---|---|---|---|---|---|
| $B_{y0}$ | — | 3.013E−02 | 1.933E−02 | −3.146E−05 | −2.356E−06 |
| $B_{y1}$ | 0.000E+00 | 0.000E+00 | 0.000E+00 | 0.000E+00 | 0.000E+00 |
| $B_{y2}$ | 0.000E+00 | −4.026E−07 | −3.701E−07 | 7.938E−09 | −3.893E−10 |
| $B_{y3}$ | 0.000E+00 | 0.000E+00 | 0.000E+00 | 0.000E+00 | 0.000E+00 |
| $B_{y4}$ | 9.657E−08 | 1.509E−11 | 3.248E−11 | 8.053E−13 | −5.653E−14 |
| $B_{y5}$ | 0.000E+00 | 0.000E+00 | 0.000E+00 | 0.000E+00 | 0.000E+00 |
| $B_{y6}$ | −2.574E−12 | −6.365E−15 | −8.721E−15 | −1.384E−16 | 0.000E+00 |
| $B_{y7}$ | 0.000E+00 | 0.000E+00 | 0.000E+00 | 0.000E+00 | 0.000E+00 |
| $B_{y8}$ | 2.964E−17 | 4.511E−19 | 7.315E−19 | 0.000E+00 | 0.000E+00 |

Figure 14A:
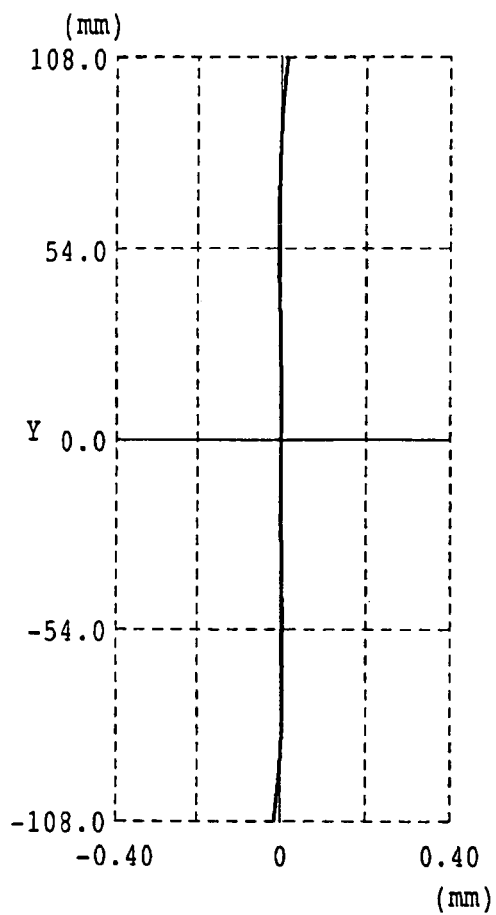
FIGS. 14A and 14B are graphs showing fθ errors of the inner optical system and outer optical system, respectively, according to a third embodiment.
Figure 14B:
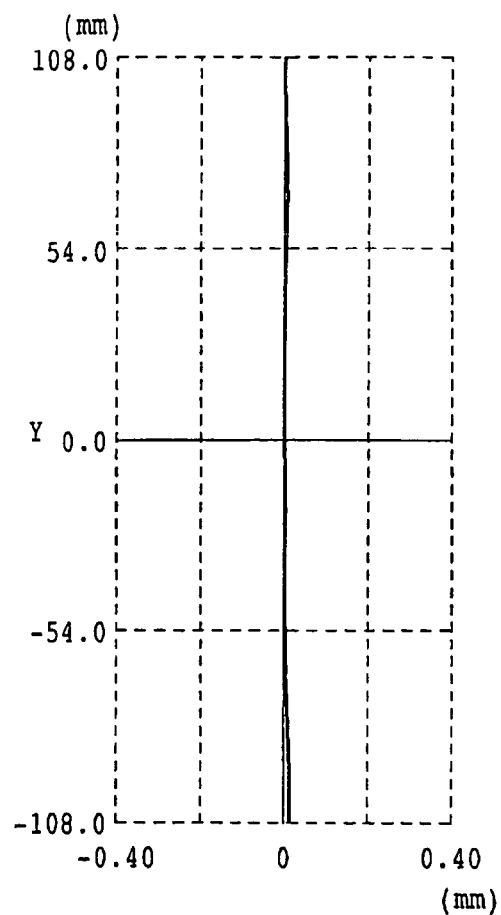
Figure 15A:
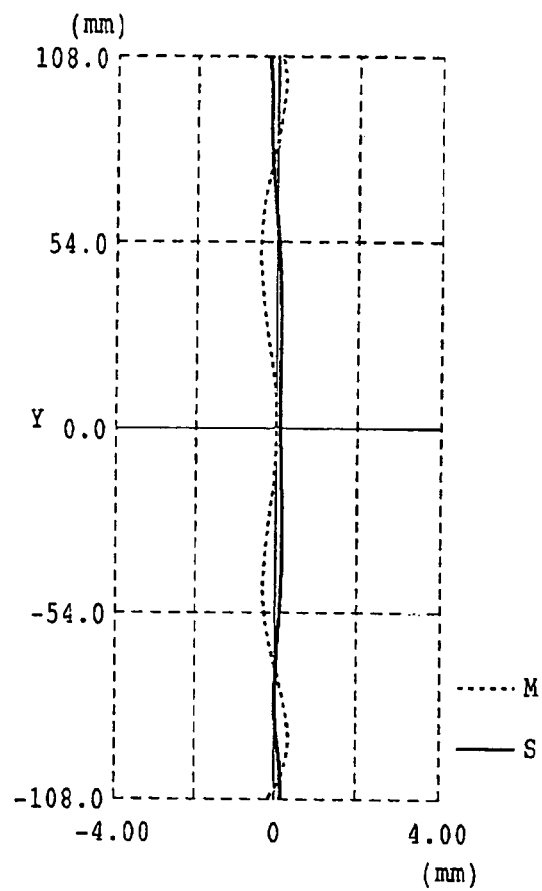
FIGS. 15A and 15B are graphs showing curvatures of field of the inner optical system and outer optical system, respectively, according to the third embodiment.
Figure 15B:
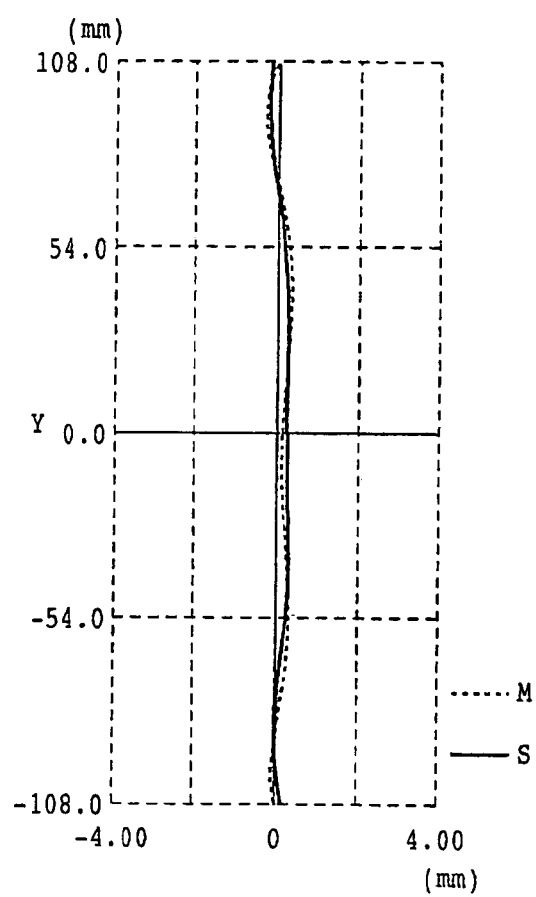
Figure 16A:
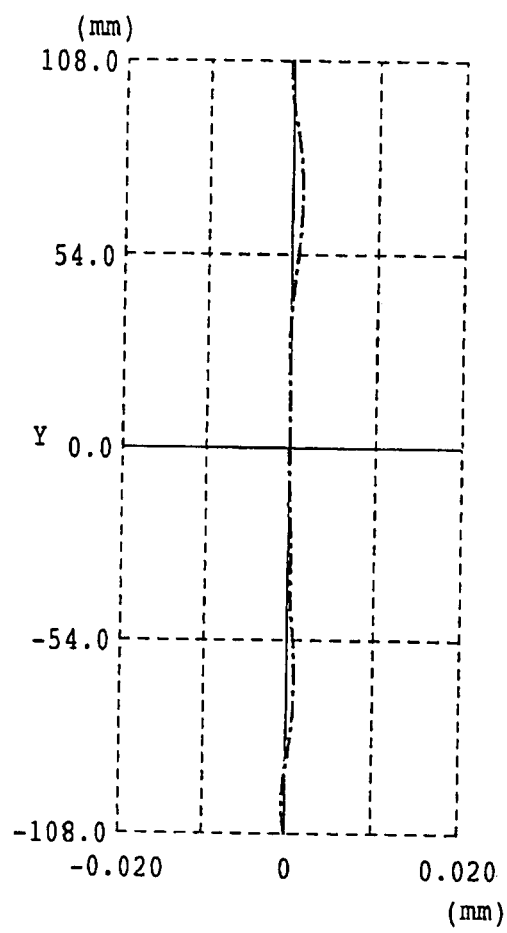
FIGS. 16A and 16B are graphs showing curvatures of scan line of the inner optical system and outer optical system, respectively, according to the third embodiment.
Figure 16B:
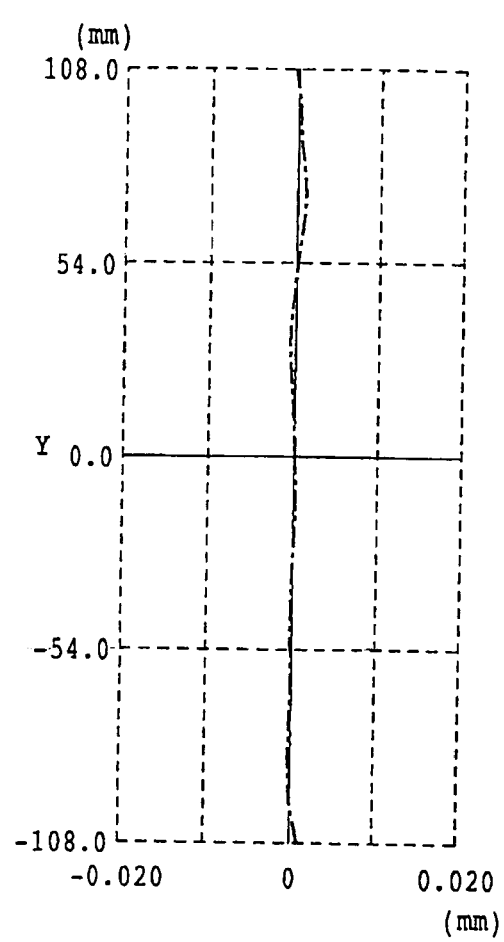
Figure 17A:
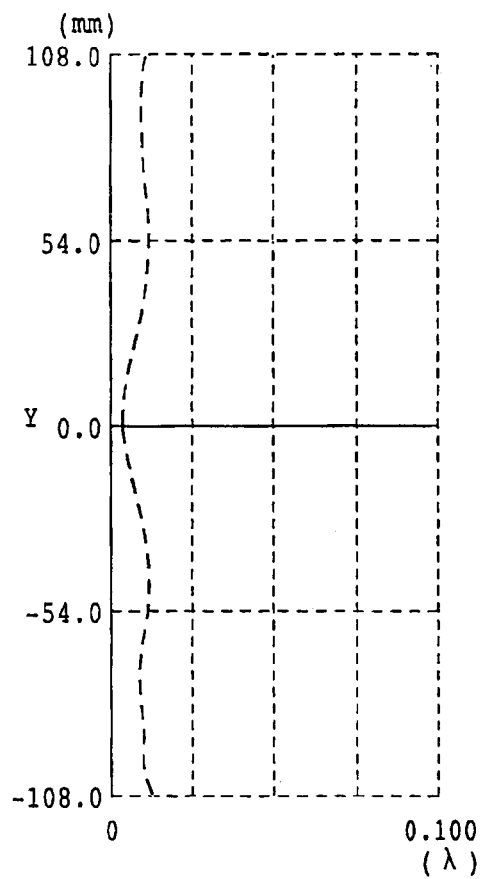
FIGS. 17A and 17B are graphs showing wavefront aberrations of the inner optical system and outer optical system, respectively, according to the third embodiment.
Figure 17B:
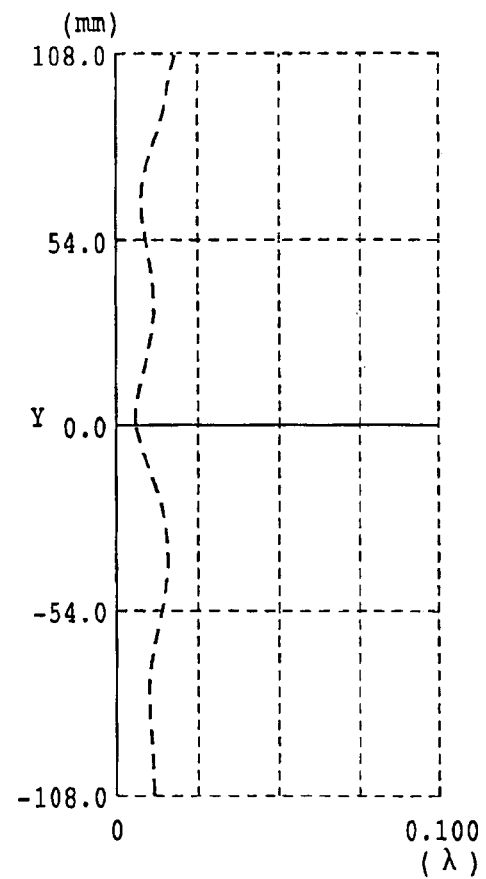

Optical performance of the optical systems in the scanning optical system according to the third embodiment is indicated in FIGS. 14A through 17B. Specifically, FIGS. 14A and 14B are graphs showing f$\theta$ errors of the inner optical system and outer optical system, respectively. FIGS. 15A and 15B are graphs showing curvatures of field, in the main scanning direction (broken line) and the auxiliary scanning direction (solid line) of the inner optical system and outer optical system, respectively. FIGS. 16A and 16B are graphs showing curvatures of scan line (bow) of the inner optical system and outer optical system, respectively. FIGS. 17A and 17B are graphs showing wavefront aberrations of the inner optical system and outer optical system, respectively.

In each of the graphs, a vertical axis Y represents a position in the main scanning direction, and a horizontal axis represents a quantity of the aberration. In each graph, the unit of measure of the vertical axis is [mm], and in each of the graphs shown in FIGS. 13A through 16B, the unit of measure of the horizontal axis is [mm]. In the graphs shown in FIGS. 17A and 17B, the unit of the horizontal axis is a wavelength (RMS value).

As indicated in FIGS. 14A through 17B, according to the third embodiment, the fundamental requirements are satisfied, while various aberrations are well suppressed.
m Fourth Embodiment Table 10 indicates numerical structures of the inner and outer optical systems of the scanning optical system according to the fourth embodiment.

TABLE 10

| No. | Ry | Rz | d | n | DECZ | TILT-β | Description |
|---|---|---|---|---|---|---|---|
| 1 | ∞ | −51.08 | 4.00 | 1.5107 | 0.00 | 0.00 | Cylindrical lens |
| 2 | ∞ | ∞ | 97.00 | 1.0000 | 0.00 | 0.00 | |
| 3 | ∞ | ∞ | 54.00 | 1.0000 | 0.00 | 0.00 | Polygonal mirror |
| 4 | −205.07 | −205.07 | 10.00 | 1.4862 | 0.00 | 0.00 | Scanning lens |
| 5 | −72.25 | −110.45 | 140.00 | 1.0000 | 0.00 | 0.00 | |
| 6 | 599.66 | −599.66 | 6.00 | 1.4862 | 14.00/6.44 | 1.05/−1.08 | Long lens |
| 7 | −1800.00 | −1800.00 | 87.98 | 1.0000 | 0.00 | 0.00 | |
| 8 | ∞ | ∞ | 0.00 | 1.0000 | 2.02/−1.28 | 0.00 | Image plane |

Meaning of each item in TABLE 10 is similar to that in TABLE 1. The focal length of the entire scanning optical system is 235 mm, and the effective scanning width on the surface S to be scanned is 216 mm.

According to the fourth embodiment, when the optical paths of the laser beams incident on the polygonal mirror 5 are projected onto the auxiliary scanning plane, the incident angle of the outer beam with respect to the polygonal mirror 5 on the auxiliary scanning plane is 4.29° and that of the inner beam is 1.43°. When the optical paths of the laser beams incident on the polygonal mirror 5 are projected on the main scanning plane, the beams are inclined with respect to the reference axis by 75.0° on the main scanning plane.

By applying the above values to condition (1), since $\beta=0.0749$ (rad.), $\theta=0.4308$ (rad.) and $N=2$, $\beta$ is calculated to be less than 0.1069. That is, according to the fourth embodiment, condition (1) is satisfied.

By applying the above values to condition (2), since $\Delta t=2.13°$, $|s|=(|s_1|+|s_2|)/2=(0.66°+0.75°)/2=0.0705°$ and $\Delta\beta=2.2°$, $(\Delta t+|s|)/\Delta\beta=0.98$. That is, it is understood that the fourth embodiment satisfies condition (2).

In the fourth embodiment, the front surface (i.e., fourth surface) of the scanning lens 11 is formed as a concave spherical surface, and the rear surface thereof (i.e., fifth surface) is formed as an anamorphic aspherical surface. Further, the front surfaces (i.e., sixth surfaces) and the rear surfaces (i.e., seventh surfaces) of the long lenses 12y, 12m, 12c and 12k are formed as two-dimensional polynomial aspherical surfaces.

TABLE 11 Indicates the values of the coefficients to be substituted in formulae (3) and (4) to obtain the shape of the rear surface (i.e., fifth surface) of the scanning lens 11 according to the fourth embodiment.

TABLE 11

| κ | | | 00E+00 |
|---|---|---|---|
| $AM_1$ | 0.000E+00 | $AS_1$ | 5.272E−06 |
| $AM_2$ | 0.000E+00 | $AS_2$ | 1.723E−07 |
| $AM_3$ | 0.000E+00 | $AS_3$ | 9.235E−09 |
| $AM_4$ | 9.690E−08 | $AS_4$ | 1.723E−09 |
| $AM_5$ | 0.000E−00 | $AS_5$ | −6.697E−12 |
| $AM_6$ | 1.952E−11 | $AS_6$ | −2.212E−12 |

TABLE 11-continued

| κ | | | 00E+00 |
|---|---|---|---|
| $AM_7$ | 0.000E+00 | $AS_7$ | 2.109E−16 |
| $AM_8$ | −5.375E−15 | $AS_8$ | 9.154E−16 |

TABLE 12 indicates coefficients indicating the concrete shapes of the front surfaces (sixth surfaces) of the long lenses 12y, 12m, 12c and 12k in the fourth embodiment.

TABLE 12

|  | $B_{z0}$ | $B_{z1}$ | $B_{z2}$ | $B_{z3}$ | $B_{z4}$ |
|---|---|---|---|---|---|
| $B_{y0}$ | — | 1.709E-02 | 1.650E-02 | -4.437E-05 | -2.225E-06 |
| $B_{y1}$ | 0.000E+00 | 0.000E+00 | 0.000E+00 | 0.000E+00 | 0.000E+00 |
| $B_{y2}$ | 0.000E+00 | -9.635E-07 | -2.249E-07 | 3.820E-09 | -3.799E-10 |
| $B_{y3}$ | 0.000E+00 | 0.000E+00 | 0.000E+00 | 0.000E+00 | 0.000E+00 |
| $B_{y4}$ | 5.830E-08 | -3.097E-11 | 2.091E-11 | 4.668E-13 | -5.061E-14 |
| $B_{y5}$ | 0.000E+00 | 0.000E+00 | 0.000E+00 | 0.000E+00 | 0.000E+00 |
| $B_{y6}$ | -2.551E-12 | 1.959E-15 | -3.174E-15 | -1.426E-16 | 0.000E+00 |
| $B_{y7}$ | 0.000E+00 | 0.000E+00 | 0.000E+00 | 0.000E+00 | 0.000E+00 |
| $B_{y8}$ | -2.137E-17 | 7.203E-18 | 5.648E-19 | 0.000E+00 | 0.000E+00 |

TABLE 13 indicates coefficients indicating the concrete shapes of the rear surfaces (seventh surfaces) of the long lenses 12y, 12m, 12c and 12k in the fourth embodiment.

TABLE 13

|  | $B_{z0}$ | $B_{z1}$ | $B_{z2}$ | $B_{z3}$ | $B_{z4}$ |
|---|---|---|---|---|---|
| $B_{y0}$ | — | -7.560E-02 | 1.466E-04 | -1.302E-06 | -1.251E-08 |
| $B_{y1}$ | 0.000E+00 | 0.000E+00 | 0.000E+00 | 0.000E+00 | 0.000E+00 |
| $B_{y2}$ | 0.000E+00 | -4.391E-07 | 1.833E-08 | 4.733E-10 | -1.649E-12 |
| $B_{y3}$ | 0.000E+00 | 0.000E+00 | 0.000E+00 | 0.000E+00 | 0.000E+00 |
| $B_{y4}$ | -1.216E-08 | -4.877E-13 | 1.987E-12 | 1.759E-13 | -1.861E-16 |
| $B_{y5}$ | 0.000E+00 | 0.000E+00 | 0.000E+00 | 0.000E+00 | 0.000E+00 |
| $B_{y6}$ | -4.794E-13 | 3.499E-15 | 1.359E-15 | -6.387E-18 | 0.000E+00 |
| $B_{y7}$ | 0.000E+00 | 0.000E+00 | 0.000E+00 | 0.000E+00 | 0.000E+00 |
| $B_{y8}$ | -5.539E-17 | 6.047E-18 | 1.873E-19 | 0.000E+00 | 0.000E+00 |

Figure 18A:
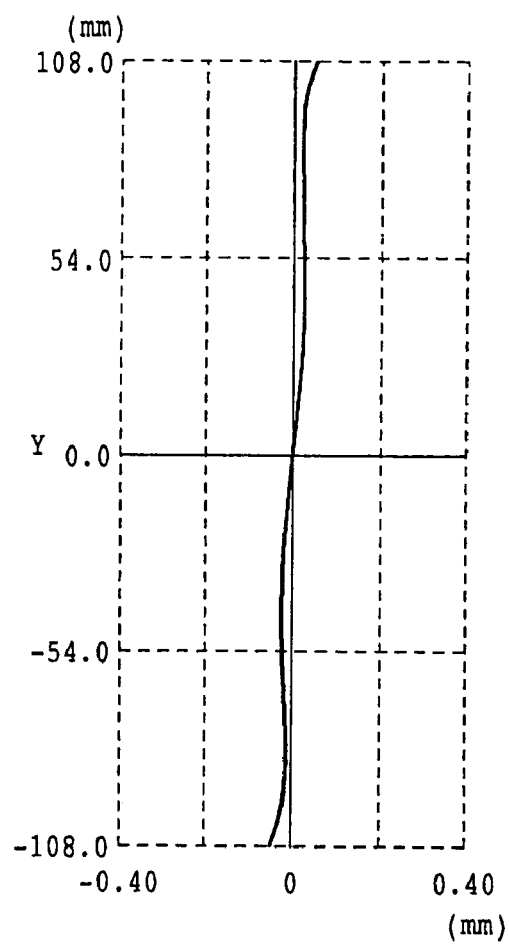
FIGS. 18A and 18B are graphs showing fθ errors of the inner optical system and outer optical system, respectively, according to a fourth embodiment.
Figure 18B:
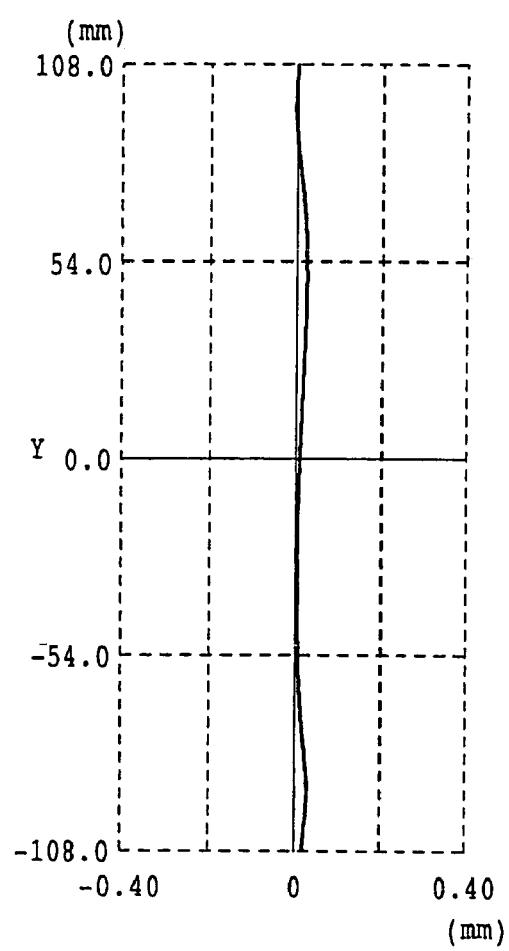
Figure 19A:
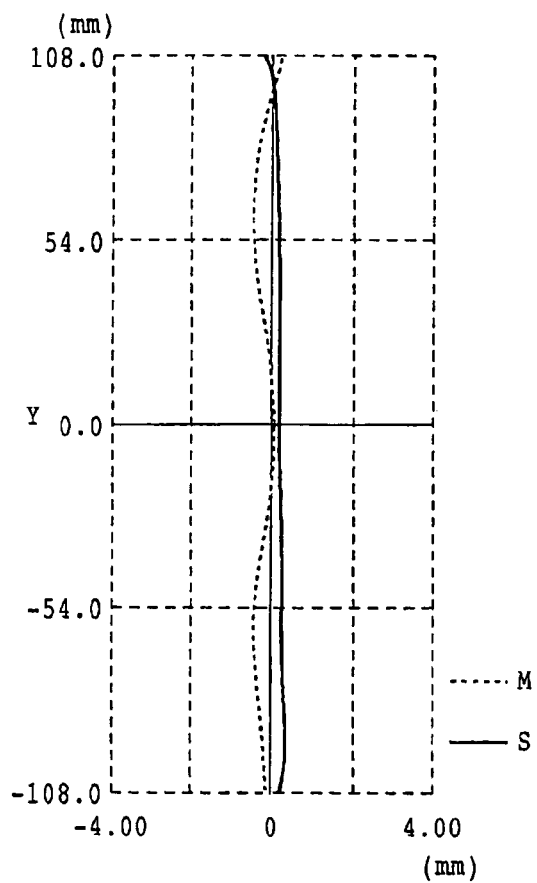
FIGS. 19A and 19B are graphs showing curvatures of field of the inner optical system and outer optical system, respectively, according to the fourth embodiment.
Figure 19B:
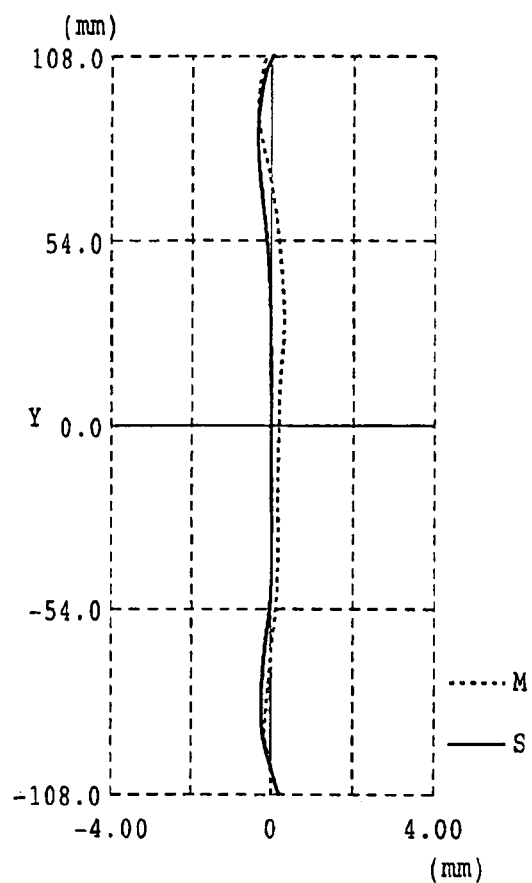
Figure 20A:
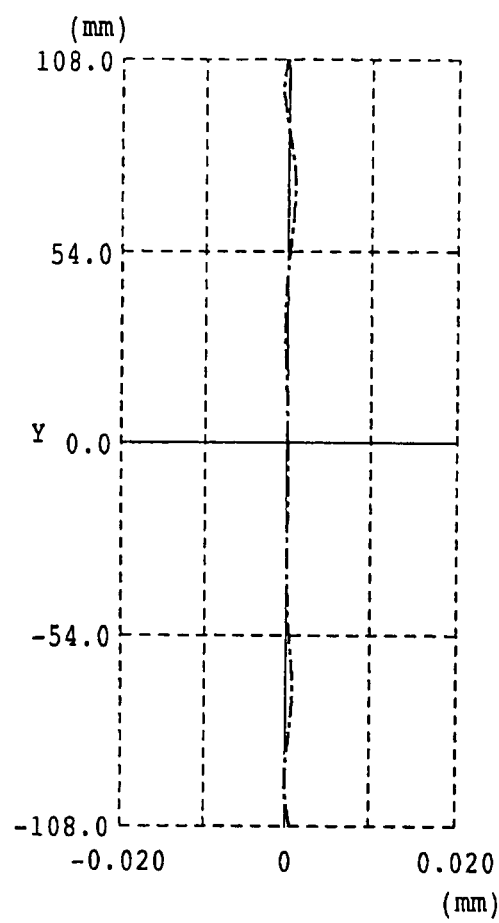
FIGS. 20A and 20B are graphs showing curvatures of scan line of the inner optical system and outer optical system, respectively, according to the fourth embodiment.
Figure 20B:
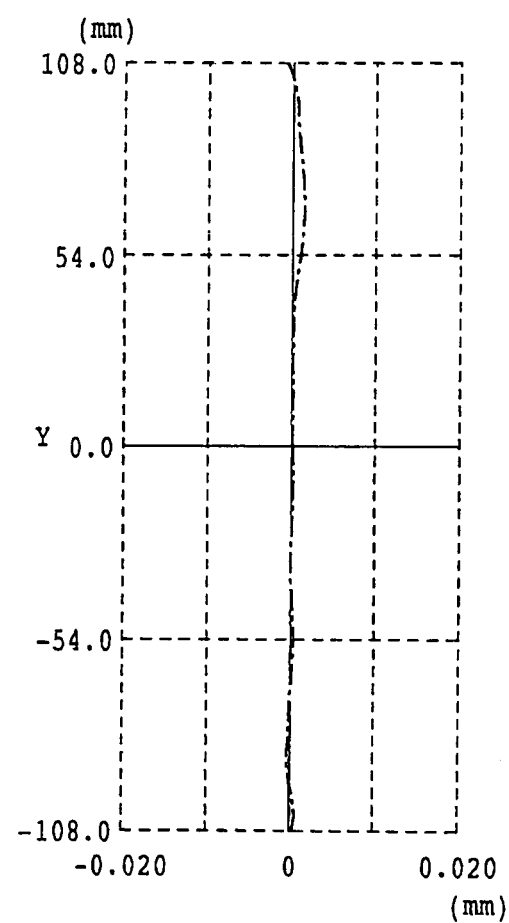
Figure 21A:
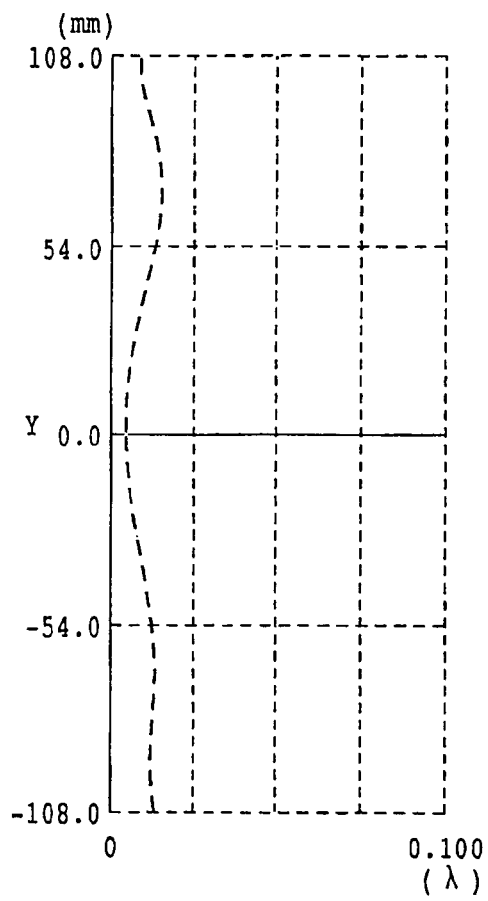
FIGS. 21A and 21B are graphs showing wavefront aberrations of the inner optical system and outer optical system, respectively, according to the fourth embodiment.
Figure 21B:
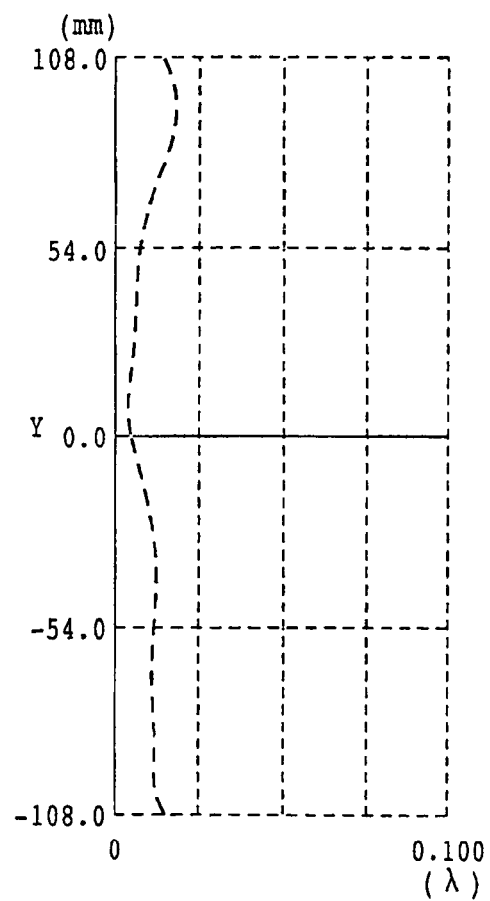
Figure 22:
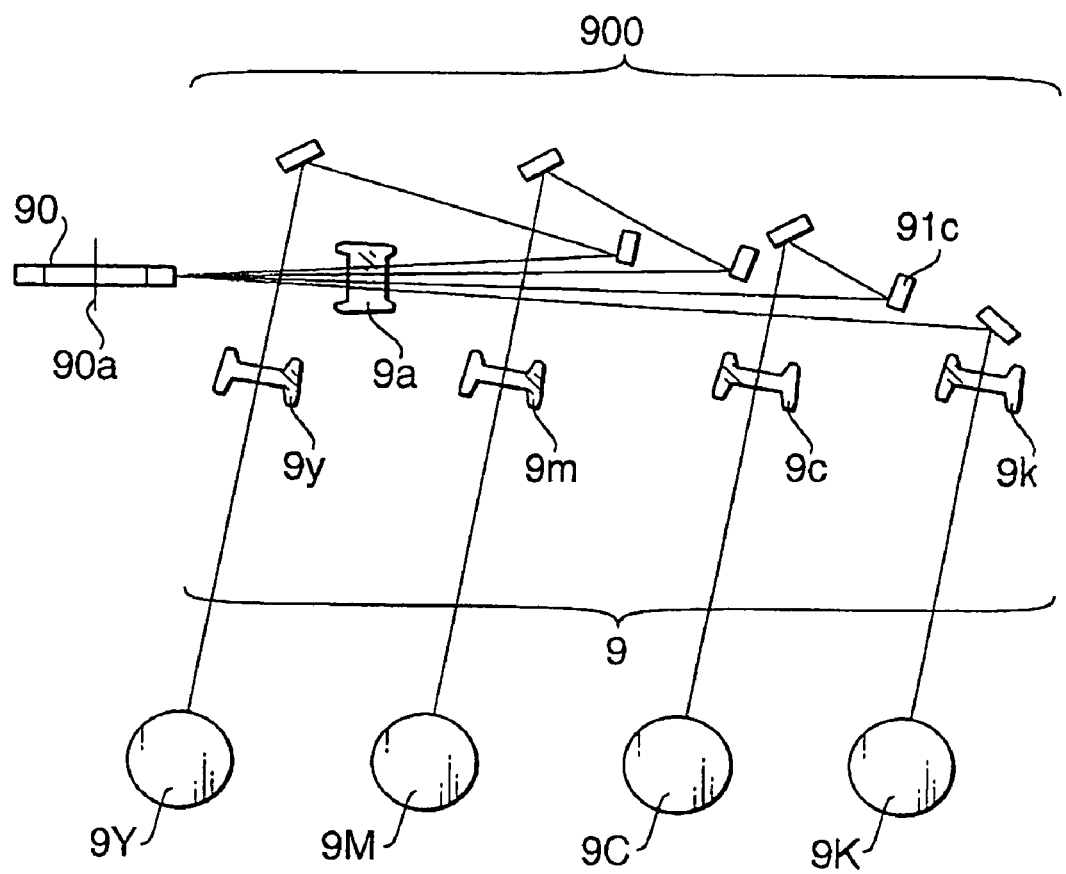
FIG. 22 is a side view of an optical configuration of a conventional scanning optical system.

Optical performance of the optical systems in the scanning optical system according to the fourth embodiment is indicated in FIGS. 18A through 21B. Specifically, FIGS. 18A and 18B are graphs showing fθ errors of the inner optical system and outer optical system, respectively. FIGS. 19A and 19B are graphs showing curvatures of field, in the main scanning direction (broken line) and the auxiliary scanning direction (solid line) of the inner optical system and outer optical system, respectively. FIGS. 20A and 20B are graphs showing curvatures of scan line (bow) of the inner optical system and outer optical system, respectively. FIGS. 21A and 21B are graphs showing wavefront aberrations of the inner optical system and outer optical system, respectively.

In each of the graphs, a vertical axis Y represents a position in the main scanning direction, and a horizontal axis represents a quantity of the aberration. In each graph, the unit of measure of the vertical axis is [mm], and in each of the graphs shown in FIGS. 18A through 20B, the unit of measure of the horizontal axis is [mm]. In the graphs shown in FIGS. 21A and 21B, the unit of the horizontal axis is a wavelength (RMS value).

As indicated in FIGS. 18A through 21B, according to the fourth embodiment, the fundamental requirements are satisfied, while various aberrations are well suppressed.

The present disclosure relates to the subject matter contained in Japanese Patent Application No. 2003-137477, filed on May 15, 2003, which is expressly incorporated herein by reference in its entirety.

What is claimed is:

1. A scanning optical system, comprising:
   a laser source unit that emits a plurality of laser beams;
   a deflector that dynamically deflects the plurality of laser beams incident on a reflection surface in a main scanning direction, the plurality of laser beams being incident on the reflection surface along different paths in an auxiliary scanning direction which is perpendicular to the main scanning direction; and
   an imaging optical system that converges the dynamically deflected plurality of laser beams on a plurality of surfaces, which correspond to the plurality of laser beams, respectively,
   wherein the imaging optical system includes:
   a scanning lens group having at least one anamorphic aspherical surface on which the dynamically deflected plurality of laser beams are incident, a cross sectional shape, in the main scanning direction, of the anamorphic aspherical surface being defined as a function of a distance in the main scanning direction from a reference axis thereof, a cross sectional shape, in the auxiliary scanning direction, of the anamorphic aspherical surface being defined, independent of the cross sectional shape in the main scanning direction, as a function of a distance from the reference axis thereof; and
   a plurality of long lenses on which the plurality of laser beams passed through the scanning lens group being incident, respectively, all of the plurality of long lenses having the same optical surfaces, at least one surface of each of the plurality of long lenses being a two-dimensional polynomial aspherical surface, cross sectional shapes, in the main scanning direction and auxiliary scanning direction, of the two-dimensional polynomial aspherical surface being defined by a polynomial regarding a distance from a reference axis thereof, and
   wherein the plurality of long lenses are arranged such that the reference axes of the plurality of long lenses are inclined with respect to the reference axis of the scanning lens group at different angles depending on the incident angles, in the auxiliary scanning direction, of the laser beams that pass through the plurality of long lenses, respectively.

2. The scanning system according to claim 1, wherein a following relationship is satisfied:

$$\beta < 0.15 - 0.2\theta/N,$$

where, β denotes an absolute value of the incident angle (unit: radian) of the outermost one of the plurality of laser beams incident on the reflection surface in the auxiliary scanning direction, θ denotes a half field angle (unit: radian) representing the maximum inclination angle of the laser beam with respect to the reference axis of the scanning lens group in the main scanning direction, and N denotes the number of surfaces of the long lenses employing the two-dimensional polynomial aspherical surface.

3. The scanning optical system according to claim 1,
wherein the anamorphic aspherical surface is configured such that a cross sectional shape in the auxiliary scanning direction has an arc shape, a curvature of the cross sectional shape of the anamorphic aspherical surface in the auxiliary scanning direction varies depending on a distance from the reference axis of the scanning lens group and asymmetrically with respect to the reference axis, a refractive power in the auxiliary scanning direction of the anamorphic aspherical surface being lower at a position farther from the reference axis in the main scanning direction, and
wherein the two-dimensional polynomial aspherical surface of each of the long lenses is configured to be asymmetrical with respect to a plane including the reference axis of each of the long lenses and parallel with the main scanning direction, the two-dimensional polynomial aspherical surface being symmetrical with respect to an auxiliary scanning plane which is a plane including reference axis of each of the long lenses and parallel with the auxiliary scanning direction, a shape of the two-dimensional polynomial aspherical surface in a direction parallel with the auxiliary scanning plane varying depending on a distance from the auxiliary scanning plane.

4. The scanning optical system according to claim 1, wherein both surfaces of each of the plurality of long lenses are the two-dimensional polynomial aspherical surfaces.

5. The scanning optical system according to claim 1,
wherein the plurality of laser beams are incident on the scanning lens group symmetrically with respect to a main scanning plane which is defined as a plane including the reference axis of the scanning lens group and parallel with the main scanning direction, and
wherein the plurality of long lenses are arranged symmetrically with respect to the main scanning plane.

6. The scanning optical system according to claim 5,
wherein four laser beams are Incident on the scanning lens group, the four laser beams proceeding along two pairs of optical paths and entering the scanning lens group, one of the two pairs of optical paths being symmetrical to the other of the two pairs of optical paths with respect to the main scanning plane,
wherein the plurality of long lenses including a pair of outer long lenses arranged at farther positions from the main scanning plane to receive a pair of outer laser beams proceeding farther paths from the main scanning plane and a pair of inner long lenses arranged at closer positions to the main scanning plane to receive a pair of inner laser beams proceeding closer paths to the main scanning plane,
wherein an intersecting point at which the reference axes of each of the outer long lenses and adjoining one of the inner long lenses intersect is located on the scanning lens group side of the long lenses, and
wherein an inclination angle of the reference axis of the adjoining one of the inner long lenses with respect to the reference axis of the each of the outer long lenses in the auxiliary scanning direction is greater than a difference between an incident angle of one of the outer laser beams with respect to the reflection surface in the auxiliary scanning direction and an incident angle of adjoining one of the inner laser beams with respect to the reflection surface in the auxiliary scanning direction.

7. The scanning optical system according to claim 6, satisfying a relationship:

$$0.7 < (\Delta t + |s|)/\Delta\beta < 1.0$$

where, Δβ denotes a difference between the incident angles (unit: degrees) of the one of the outer laser beams with respect to the adjoining one of the inner laser beams incident on the reflection surface of the deflector in the auxiliary scanning direction, Δt denotes a difference between a tilting amount (unit: degrees) of one of the outer long lenses and the adjoining one of the inner long lenses in the auxiliary scanning direction, and s denotes a difference (unit: degrees) between a maximum angles and minimum angles of the inclination of the two-dimensional polynomial aspherical surface with respect to a line parallel with the auxiliary scanning direction.

8. The scanning optical system according to claim 2,
wherein the anamorphic aspherical surface is configured such that a cross sectional shape in the auxiliary scanning direction has an arc shape, a curvature of the cross sectional shape of the anamorphic aspherical surface in the auxiliary scanning direction varies depending on a distance from the reference axis of the scanning lens group and asymmetrically with respect to the reference axis, a refractive power in the auxiliary scanning direction of the anamorphic aspherical surface being lower at a position farther from the reference axis in the main scanning direction, and
wherein the two-dimensional polynomial aspherical surface of each of the long lenses is configured to be asymmetrical with respect to a plane including the reference axis of each of the long lenses and parallel with the main scanning direction, the two-dimensional polynomial aspherical surface being symmetrical with respect to an auxiliary scanning plane which is a plane including reference axis of each of the long lenses and parallel with the auxiliary scanning direction, a shape of the two-dimensional polynomial aspherical surface in a direction parallel with the auxiliary scanning plane varying depending on a distance from the auxiliary scanning plane.

9. The scanning optical system according to claim 2, wherein both surfaces of each of the plurality of long lenses are the two-dimensional polynomial aspherical surfaces.

10. The scanning optical system according to claim 2,
wherein the plurality of laser beams are incident on the scanning lens group symmetrically with respect to a main scanning plane which is defined as a plane including the reference axis of the scanning lens group and parallel with the main scanning direction, and
wherein, the plurality of long lenses are arranged symmetrically with respect to the main scanning plane.

11. The scanning optical system according to claim 10,
wherein four laser beams are incident on the scanning lens group, the four laser beams proceeding along two pairs of optical paths and entering the scanning lens group, one of the two pairs of optical paths being symmetrical to the other of the two pairs of optical paths with respect to the main scanning plane, wherein the plurality of long lenses including a pair of outer long lenses arranged at farther positions from the main scanning plane to receive a pair of outer laser beams proceeding farther paths from the main scanning plane and a pair of inner long lenses arranged at closer positions to the main scanning plane to receive a pair of inner laser beams proceeding closer paths to the main scanning plane, wherein an intersecting point at which the reference axes of each of the outer long lenses and adjoining one of the inner long lenses intersect is located on the scanning lens group side of the long lenses, and wherein an inclination angle of the reference axis of the adjoining one of the inner long lenses with respect to the reference axis of the each of the outer long lenses in the auxiliary scanning direction is greater than a difference between an incident angle of one of the outer laser beams with respect to the reflection surface in the auxiliary scanning direction and an incident angle of adjoining one of the inner laser beams with respect to the reflection surface in the auxiliary scanning direction.

12. The scanning optical system according to claim 11, satisfying a relationship:

$$0.7 < (\Delta t + |s|)/\Delta \beta < 1.0$$

where, $\Delta \beta$ denotes a difference between the incident angles (unit: degrees) of the one of the outer laser beams with respect to the adjoining one of the inner laser beams incident on the reflection surface of the deflector in the auxiliary scanning direction, $\Delta t$ denotes a difference between a tilting amount (unit: degrees) of one of the outer long lenses and the adjoining one of the inner long lenses in the auxiliary scanning direction, and s denotes a difference (unit: degrees) between a maximum angles and minimum angles of the inclination of the two-dimensional polynomial aspherical surface with respect to a line parallel with the auxiliary scanning direction.

* * * * *